(12) United States Patent
Shirano

(10) Patent No.: US 9,477,559 B2
(45) Date of Patent: Oct. 25, 2016

(54) CONTROL DEVICE, CONTROL METHOD AND RECORDING MEDIUM STORING PROGRAM THEREOF

(71) Applicant: NEC CORPORATION, Tokyo (JP)

(72) Inventor: Yasuyuki Shirano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 132 days.

(21) Appl. No.: 14/489,569

(22) Filed: Sep. 18, 2014

(65) Prior Publication Data

US 2015/0095699 A1 Apr. 2, 2015

(30) Foreign Application Priority Data

Sep. 27, 2013 (JP) .................................. 2013-200874

(51) Int. Cl.
*G06F 11/16* (2006.01)

(52) U.S. Cl.
CPC ......... *G06F 11/1641* (2013.01); *G06F 11/165* (2013.01); *G06F 11/1654* (2013.01); *G06F 2201/83* (2013.01)

(58) Field of Classification Search
CPC ........... G06F 11/1641; G06F 11/1654; G06F 11/165; G06F 11/182; G06F 11/202; G06F 11/2025; G06F 11/2028; G06F 11/2035; G06F 11/2043; G06F 11/2046; G06F 2201/83; G06F 2201/85
See application file for complete search history.

(56) References Cited

U.S. PATENT DOCUMENTS

| | | | | |
|---|---|---|---|---|
| 5,993,055 A * | 11/1999 | Williams | .............. | G06F 11/184 714/732 |
| 6,279,119 B1 * | 8/2001 | Bissett | ................ | G06F 11/1633 703/23 |
| 6,327,668 B1 * | 12/2001 | Williams | .................. | G06F 9/52 712/9 |
| 7,539,897 B2 * | 5/2009 | Mizutani | ............. | G06F 11/1645 714/11 |
| 8,140,893 B2 * | 3/2012 | Niino | .................. | G06F 11/1679 714/11 |
| 8,935,569 B2 * | 1/2015 | Kabulepa | ............ | G06F 11/1641 714/11 |

FOREIGN PATENT DOCUMENTS

| | | |
|---|---|---|
| JP | 2006-178615 | 7/2006 |
| JP | 2006-178616 | 7/2006 |
| JP | 2006-178618 | 7/2006 |
| JP | 2010-218370 | 9/2010 |

OTHER PUBLICATIONS

Japanese Office Action, dated Mar. 17, 2015, in corresponding Japanese Patent Application No. 2013-200874, with partial English translation.

* cited by examiner

*Primary Examiner* — Nadeem Iqbal
(74) *Attorney, Agent, or Firm* — Young & Thompson

(57) ABSTRACT

A control device according to an exemplary aspect of the present invention, which is included in a sub-system of a plurality of sub-systems included in a fault tolerant system, includes: a packet reception unit that receives data from a processor unit included in the plurality of sub systems each including: the processor unit; an input-output unit; and a signal transmission path, the control device being connected between the processor unit and the input-output unit; and a first transmission unit that transmits error detection data being generated from the data of accessing from the processor unit to the input-output unit in an own sub-system to an companion sub-system when the processor unit is in the lockstep synchronous state, and transmits the data of accessing from a processor unit to the input-output unit in the own sub-system to the companion sub-system when the processor is in a lockstep asynchronous state.

10 Claims, 21 Drawing Sheets

CONTROL DEVICE, CONTROL METHOD AND RECORDING MEDIUM STORING PROGRAM THEREOF

This application is based upon and claims the benefit of priority from Japanese Patent Application No. 2013-200874, filed on Sep. 27, 2013, the disclosure of which is incorporated herein in its entirety by reference.

TECHNICAL FIELD

The present invention relates to a control device of a fault tolerant system, an operating method thereof, and a program.

BACKGROUND ART

A fault tolerant system is known as a computer system with high availability. In the fault tolerant system, an application or OS (Operation System) can transparently continue without special processing. As a system forming the fault tolerant system, a hardware system and a software system are known. The present invention relates to an innovation of the fault tolerant system employing the hardware system.

In the fault tolerant system of the hardware system, main hardware components, like a CPU (Central Processing Unit), memory, storage, etc. include redundant configurations. If a failure occurs in a component, the fault tolerant system using the hardware system separates the component therefrom and continues operations. A module including the CPU and memory is called a CPU sub-system, and a module including various types of IO (Input Output) devices is called an IO sub-system. In a common fault tolerant system with duplicate component, a method of system duplexing for the CPU sub-system differs from a method of system duplexing for the IO sub-system. The duplicated CPU sub-systems perfectly match hardware operations by the clock. This is called lockstep synchronization. Since the CPU sub-systems which are duplicated perform perfectly identical operations, the CPU sub-system in which a failure occurs is logically separated when the failure occurs, and the CPU sub-system which is normal instantly takes over the operations to continue the operations. Though the IO sub-system is not in the lockstep synchronization, another IO sub-system takes over operations when a failure occurs.

A method in which comparing data of accessing from each of the CPU sub-systems to the IO sub-system is compared is known as a method of detecting an abnormal operation of the CPU sub-system in the lockstep synchronous state. In the method, each of the sub-systems generates checksum from access data generated in a CPU of the sub-system. Each of the sub-systems transmits the generated checksum to another sub-system through a crosslink. Each of the sub-systems detects mismatch of operations in the sub-systems by comparing the generated checksum with the checksum received through the crosslink. The method described above is disclosed as a first related technology related to the invention (e.g. refer to Patent Literature 1 (Japanese Patent Application Laid-open No. 2010-218370)).

Related technologies of the fault tolerant system are described below.

A fault tolerant system in which two systems are connected to each other through the crosslink is known. Each of the two systems includes a CPU sub-system, an IO system connected thereto, and a ft (fault tolerant) controller. The CPU sub-system works at the same timing between the systems based on clock step synchronization. The ft controller is connected between the two systems. The ft controller associates a plurality of system operations performing error processing, duplexing processing, and resynchronization for fault tolerant in the systems with preset event signals each of which represents one of a plurality of relating states, respectively. Thereby the ft controller manages the plurality of system operations. The ft controller selects a system operation in the plurality of system operations depending on the event signals and causes the CPU sub-system to operate the selected system operation, while transferring the state of each system. The fault tolerant system described above is disclosed as a second related technology related to the invention (e.g. refer to Patent Literature 2 (Japanese Patent Application Laid-open No. 2006-178616)).

A fault tolerant system described below is known as the above-described fault tolerant system. In the fault tolerant system, tag information including ID (Identifier) codes of an access source and an access destination and synchronization information on whether access is synchronous or not are given to an access packet from a CPU sub-system to an IO sub-system. An access comparing unit of each system determines whether to perform a first access operation or a second access operation on the basis of the tag information given to the access packet. The first access operation is an access operation which is performed when a plurality of CPU sub-systems are in a lockstep synchronous state. The second access operation is an access operation depending on an asynchronous state. The fault tolerant system described above is disclosed as a third related technology related to the invention (e.g. refer to Patent Literature 3 (Japanese Patent Application Laid-open No. 2006-178615)).

SUMMARY

Problem to be Solved by the Invention

In the first related technology related to the invention, the checksum generated from a packet, which is not a packet itself, is transmitted to another sub-system, referred to as a companion sub-system in the following, through the crosslink. When the generated checksum is compared with the checksum received from the companion sub-system through the crosslink, mismatch of operations in the sub-systems is detected. Thereby amounts of data flowing in the crosslink can be decreased compared with the case in which the packet itself is transmitted to the companion sub-system through the crosslink. In the first related technology, a packet itself is not transmitted, but the checksum generated from the packet is transmitted to the companion sub-system through the crosslink. In the first related technology, however, it is difficult to operate a fault tolerant system in the lockstep asynchronous state. That is because even though the checksum generated from a packet is transmitted to the companion sub-system through the crosslink, a packet which is the same as the packet of the source thereof does not exist in the sub-system. In such lockstep asynchronous state, it is not able to access the input-output unit of the companion sub-system. In the third related technology related to the invention, the fault tolerant system can work in the lockstep synchronous state and in the lockstep asynchronous state. However since the packet itself is transmitted through the crosslink, it is difficult to reduce amounts of data which flows in the crosslink.

One of objects of the invention is to provide a fault tolerant system solving the problem described above. The problem described above is that it is difficult to operate the fault tolerant system in the lockstep synchronous state and in the lockstep asynchronous state while decreasing amounts of data which flows in a signal transmission path connecting the sub-systems with each other.

Means for Solving the Problem

A control device according to an exemplary aspect of the present invention, which is included in a sub-system of a plurality of sub-systems included in a fault tolerant system, includes: a packet reception unit that receives data from a processor unit included in the plurality of sub systems each including: the processor unit being operable in a lockstep synchronous state of the plurality of sub-systems and in a lockstep asynchronous state of the plurality of sub-systems; an input-output unit being connected with the processor unit; and a signal transmission path connecting the plurality of sub-systems one another through the control device, the control device being connected between the processor unit and the input-output unit; and a first transmission unit that transmits error detection data being generated from the data of accessing from the processor unit to the input-output unit in an own sub-system being a sub-system including the control device to an companion sub-system being other than the own sub-system when the processor unit is in the lockstep synchronous state, and transmits the data of accessing from the processor unit to the input-output unit in the own sub-system to the companion sub-system when the processor is in the lockstep asynchronous state, the own sub-system and the companion sub-systems being in the plurality of sub-systems.

A control method according to an exemplary aspect of the present invention, which is of controlling a fault tolerant system including a plurality of sub-systems, includes: receiving data from the processor unit included in the plurality of sub-systems each including: a processor unit being operable in a lockstep synchronous state of the plurality of sub-systems and in a lockstep asynchronous state of the plurality of sub-systems; an input-output unit being connected with the processor unit; a control unit being connected between the processor unit and the input-output unit; and a signal transmission path connecting the plurality of sub-systems to one another through the control unit; transmitting, when the processor unit is in the lockstep synchronous state, error detection data generated from the data of accessing from the processor unit to the input-output unit in an own sub-system being a sub-system including the control device to an companion sub-system being other than the own sub-system, and transmitting, when the processor unit is in the lockstep asynchronous state, the data of accessing from the processor unit to the input-output unit in the own sub-system to the companion sub-system, the own sub-system and the companion sub-systems being in the plurality of sub-systems.

A non-transitory computer-readable recording medium according to an exemplary aspect of the present invention stores a program causing a computer of a control device included in a plurality of sub-systems included in a fault tolerant system to execute processing of: receiving data from a processor unit in the plurality of sub-systems each including the processor unit being operable in a lockstep synchronous state of the plurality of sub-systems and in a lockstep asynchronous state of the plurality of sub-systems, an input-output unit being connected with the processor unit, and a signal transmission path connecting the plurality of sub-systems one another through the control device, the control device being connected between the processor unit and the input-output unit; transmitting, when the processor is in the lockstep synchronous state, error detection data that is generated from the data of accessing from the processor unit to the input-output unit in the own sub-system to the companion sub-system, the own sub-system and the companion sub-systems being in the plurality of sub-systems, the own sub-system being a sub-system including the control device, the companion sub-system being other than the own sub-system; and transmitting, when the processor is in the lockstep asynchronous state, the data of accessing from the processor unit to the input-output unit in the own sub-system to the companion sub-system.

Effect of the Invention

Because of having the configuration described above, according to the invention, the fault tolerant system is able to operate in the lockstep synchronous state and in the lockstep asynchronous state, while decreasing amounts of data which flows in a signal transmission path connecting the sub-systems with each other.

BRIEF DESCRIPTION OF THE DRAWINGS

Exemplary features and advantages of the present invention will become apparent from the following detailed description when taken with the accompanying drawings in which.

EXEMPLARY EMBODIMENT

Next, an exemplary embodiment of the invention is described in details with reference to drawings.

<First Exemplary Embodiment>

Figure 1:
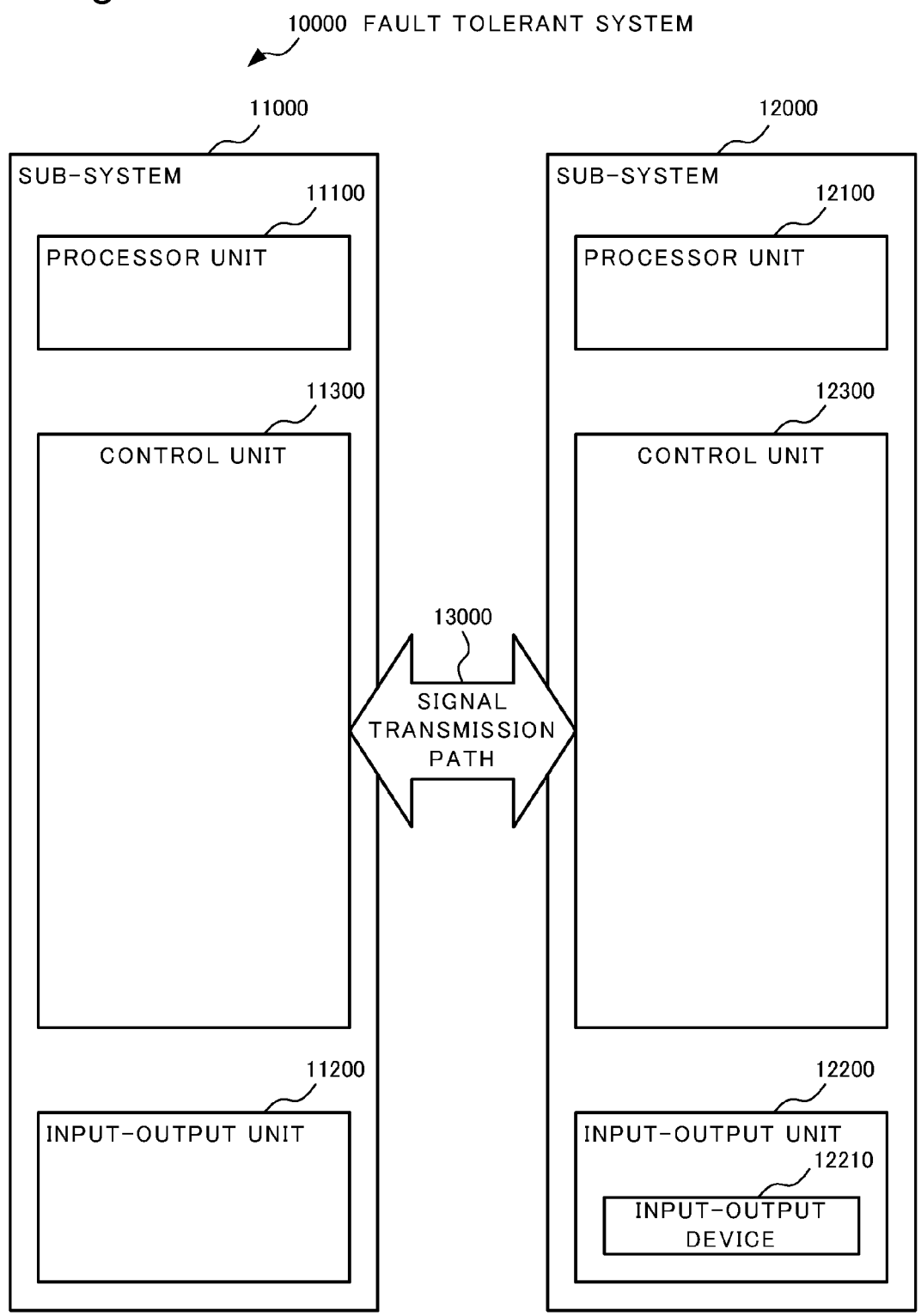
FIG. 1 is a block diagram illustrating an example of a first exemplary embodiment of the invention.

With reference to FIG. 1, a fault tolerant system 10000 of a first exemplary embodiment of the invention includes two sub-systems 11000 and 12000, each of which has an identical hardware configuration.

The sub-system 11000 includes a processor unit 11100, an input-output unit 11200 which is connected to the processor unit 11100, and a control unit 11300 connected between the processor unit 11100 and the input-output unit 11200. The sub-system 12000 includes a processor unit 12100, an input-output unit 12200 which connected with the processor unit 12100, and a control unit 12300 which is connected between the processor unit 12100 and the input-output unit 12200. A signal transmission path 13000 is provided between the sub-system 11000 and the sub-system 12000. The signal transmission path 13000 connects the sub-system 11000 and the sub-system 12000 with each other through the control units 11300 and 12300.

The processor unit 11100 and the processor unit 12100 are operable in a state where the sub-system 11000 and the sub-system 12000 (accordingly, the processor unit 11100 and the processor unit 12100) perform lockstep operations (i.e. in a lockstep synchronous state). The processor unit 11100 and the processor unit 12100 are also operable in a state where the sub-system 11000 and the sub-system 12000 (accordingly, the processor unit 11100 and the processor unit 12100) do not perform the lockstep operations (i.e. in a lockstep asynchronous state), respectively.

The control units 11300 and 12300 have following functions.

When the processor units 11100 and 12100 are in the lockstep synchronous state, the control units 11300 and 12300 transmit error detection data generated from data of accessing from the processor unit to the input-output unit in their own sub-system to their companion sub-system. The own sub-system of the control unit 11300 is the sub-system 11000 that includes the control unit 11300. The companion sub-system of the control unit 11300 is a sub-system other than the own sub-system of the control unit 11300 and is the sub-system 12000 in the present exemplary embodiment. The own sub-system of the control unit 12300 is the sub-system 12000 that includes the control unit 12300. The companion sub-system of the control unit 12300 is a sub-system other than the own sub-system of the control unit 12300 and is the sub-system 11000 in the present exemplary embodiment. The data of accessing is data used or to be used for accessing a unit or a device. More specifically, the data of accessing is data which is sent or to be sent when access to any of units and devices (i.e. the processor unit 11100, the input-output unit 11200, the processor unit 12100, the input-output unit 12200, the input-output device 12210, and the like) of the sub-systems are performed or attempted to perform in the exemplary embodiments of the present invention. The data of accessing is data including e.g. data on a destination, data on transmission source, data to be transmitted. The data of accessing may include data used for error detection, and other data. The data of accessing may be sent in a form of packets. A type of the error detection data and a generating method thereof may be arbitrarily selected. If the data of accessing from the processor unit to the input-output unit includes CRC (Cyclic Redundancy Check) in addition to original data of the data, the control units 11300 and 12300 may use the CRC as the error detection data. The control units 11300 and 12300 may calculate checksum on the basis of the data of accessing from the processor unit to the input-output unit. The control units 11300 and 12300 may use the calculated checksum as the error detection data.

When the processor units 11100 and 12100 are in the lockstep asynchronous state, the control units 11300 and 12300 transmit data of accessing from the processor unit to the input-output unit in their own sub-system to their companion sub-system. When the processor units 11100 and 12100 are in the lockstep asynchronous state, one of the processor units is shutoff in the main. If the processor unit 12100 is shutoff the processor unit 11100 performs access to the input-output units 11200 and 12200. To the companion sub-system of the control unit 11300, The control unit 11300 transmits data of accessing from the processor unit 11100 to the input-output unit 12200.

Operations of the fault tolerant system 10000 of the exemplary embodiment are explained below.

Operations which are explained as follows are operations performed when the processor units 11100 and 12100 are in the lockstep synchronous state.

Figure 2:
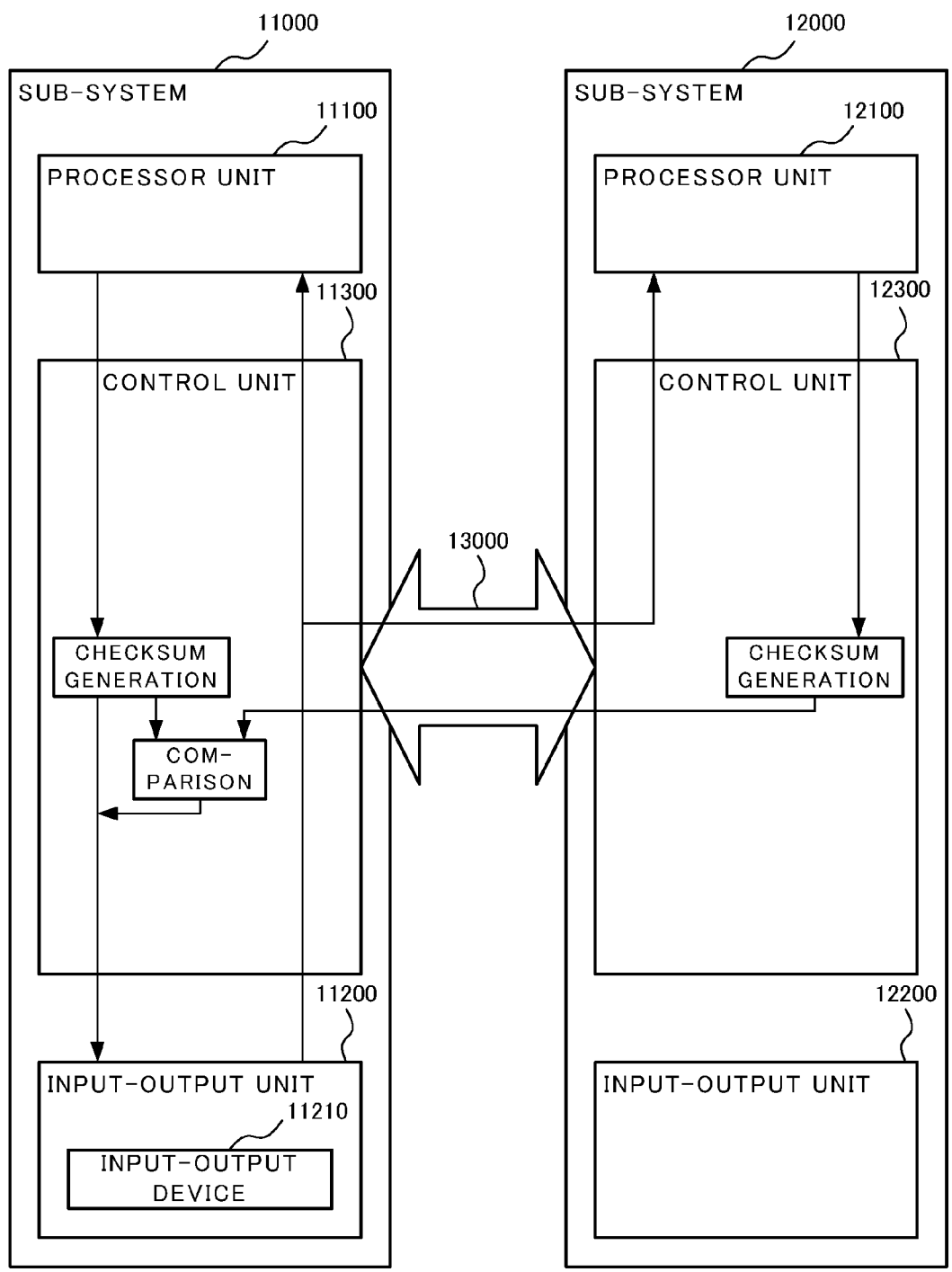
FIG. 2 is a diagram illustrating an example of an operation in a lockstep synchronous state in the first exemplary embodiment of the invention.

FIG. 2 shows a data flow on an occasion when the processor unit 11100 and the processor unit 12100 generate data of accessing an input-output device 11210 in the input-output unit 11200. FIG. 2 also shows data flow on an occasion when the input-output device 11210 generates response data in response to the access data. The processor units 11100 and 12100 are in the lockstep synchronous state. When receiving data addressed to the input-output device 11210 in the input-output unit 11200 from the processor unit 11100, the control unit 11300 generates the error detection data from the received data. The control unit 11300 accumulates the received data i.e. original data and the error detection data in a buffer in the control unit 11300 to temporarily store the original data and the error detection data thereof. When receiving data addressed to the input-output device 11210 from the processor unit 12100, the control unit 12300 generates the error detection data from the data. The control unit 12300 transmits the generated error detection data to the control unit 11300 through the signal transmission path 13000. The control unit 11300 compares the error detection data accumulated in the buffer with the error detection data received from the control unit 12300 through the signal transmission path 13000. Only when both the error detection data coincide with each other, the control unit 11300 transmits data addressed to the input-output device 11210 stored in the buffer to the input-output device 11210 in the input-output unit 11200. Thereby the control unit 11300 and the control unit 12300 avoid a case in which the input-output device 11210 is accessed under an improper condition where the error detection data of the sub-system 11000 do not coincide with the error detection data of the sub-system 12000.

The input-output device 11210 receives the above-described data, performs processing according to the above-described data, generates a result of the processing as response data, and transmits the generated response data to the control unit 11300. The processor units 11100 and 12100 are in the lockstep synchronous state. Therefore, when receiving the data from the input-output device 11210, the control unit 11300 transfers the received data to the processor unit 11100. The control unit 11300 further transfers the received data to the control unit 12300 through the signal transmission path 13000. The control unit 12300 further transfers the transferred data to the processor unit 12100.

As described above, when the processor units 11100 and 12100 are in the lockstep synchronous state, the data addressed to the input-output device 11210 from the processor unit 12100 is not transmitted to the signal transmission path 13000. The error detection data generated from the data is transmitted through the signal transmission path 13000. Consequently amounts of data on the signal transmission path 13000 can be decreased.

Figure 3:
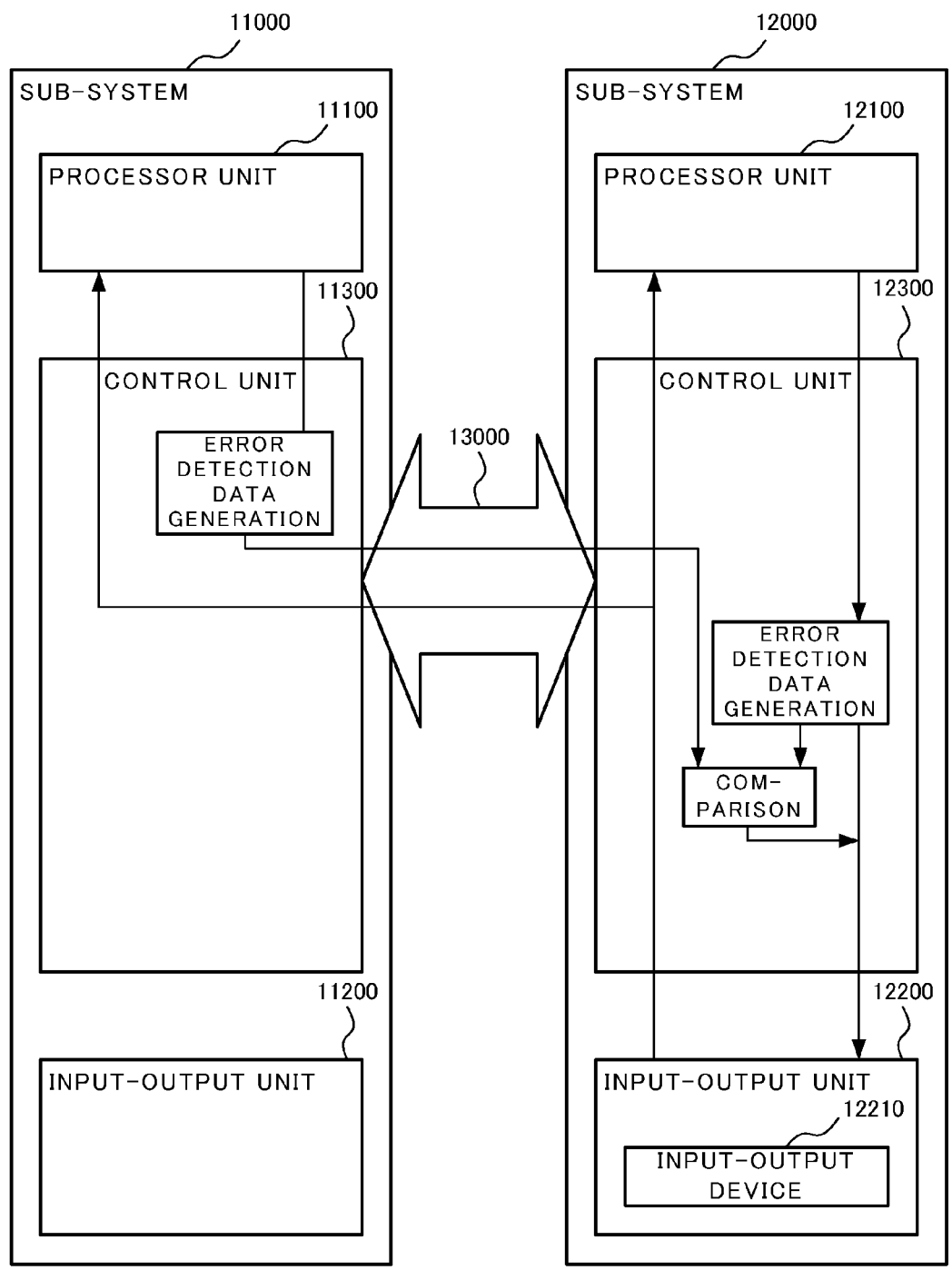
FIG. 3 is a diagram illustrating another example of an operation in the lockstep synchronous state in the first exemplary embodiment of the invention.

FIG. 3 shows a data flow on an occasion when the processor unit 11100 and the processor unit 12100 generate data to access an input-output device 12210 in the input-output unit 12200. FIG. 3 also shows a data flow on an occasion when the input-output device 12210 generates response data in response to the access data. When receiving data addressed to the input-output device 12210 in the input-output unit 12200 from the processor unit 12100, the control unit 12300 generates the error detection data from the received data. The control unit 12300 accumulates the received data i.e. original data and the error detection data in a buffer in the control unit 12300 to temporarily store the original data and the error detection data thereof. When receiving the data addressed to the input-output device 12210 from the processor unit 11100, the control unit 11300 generates the error detection data from the data. The control unit 11300 transmits the generated error detection data to the control unit 12300 through the signal transmission path 13000. The control unit 12300 compares the error detection data accumulated in the buffer with the error detection data received from the control unit 11300 through the signal transmission path 13000. Only when both the error detection data coincide with each other, the control unit 12300 transmits the data, which is stored in the buffer, addressed to the input-output device 12210 to the input-output device 12210 in the input-output unit 12200. Thereby the control unit 11300 and the control unit 12300 avoid a case in which the input-output device 12210 is accessed under an improper condition where the error detection data of the sub-system 11000 do not coincide with the error detection data of the sub-system 12000.

The input-output device 12210 receives the above-described data, performs operations according to the above-described data, generates the result of the operations as response data, and transmits the generated data to the control unit 12300. The processor units 11100 and 12100 are in the lockstep synchronous state. Therefore, when receiving the data from the input-output device 12210, the control unit 12300 transfers the received data to the processor unit 12100. The control unit 12300 transfers the data received from the input-output device 12210 to the control unit 11300 through the signal transmission path 13000. The control unit 11300 further transfers the transferred data to the processor unit 11100.

As described above, when the processor units 11100 and 12100 are in the lockstep synchronous state, the data addressed to the input-output device 12210 from the processor unit 11100 is not transmitted through the signal transmission path 13000. The error detection data generated from the data is transmitted through the signal transmission path 13000. Consequently amounts of data on the signal transmission path 13000 can be decreased.

Operations which are explained in the following are operations performed when the processor units 11100 and 12100 are in the lockstep asynchronous state. As an example, suppose that the processor unit 11100 stops the operations for some reasons, like a fault, and the processor unit 12100 continues the operations. In this case, only the processor unit 12100 generates the data of accessing the input-output unit 11200 and the input-output unit 12200.

Figure 4:
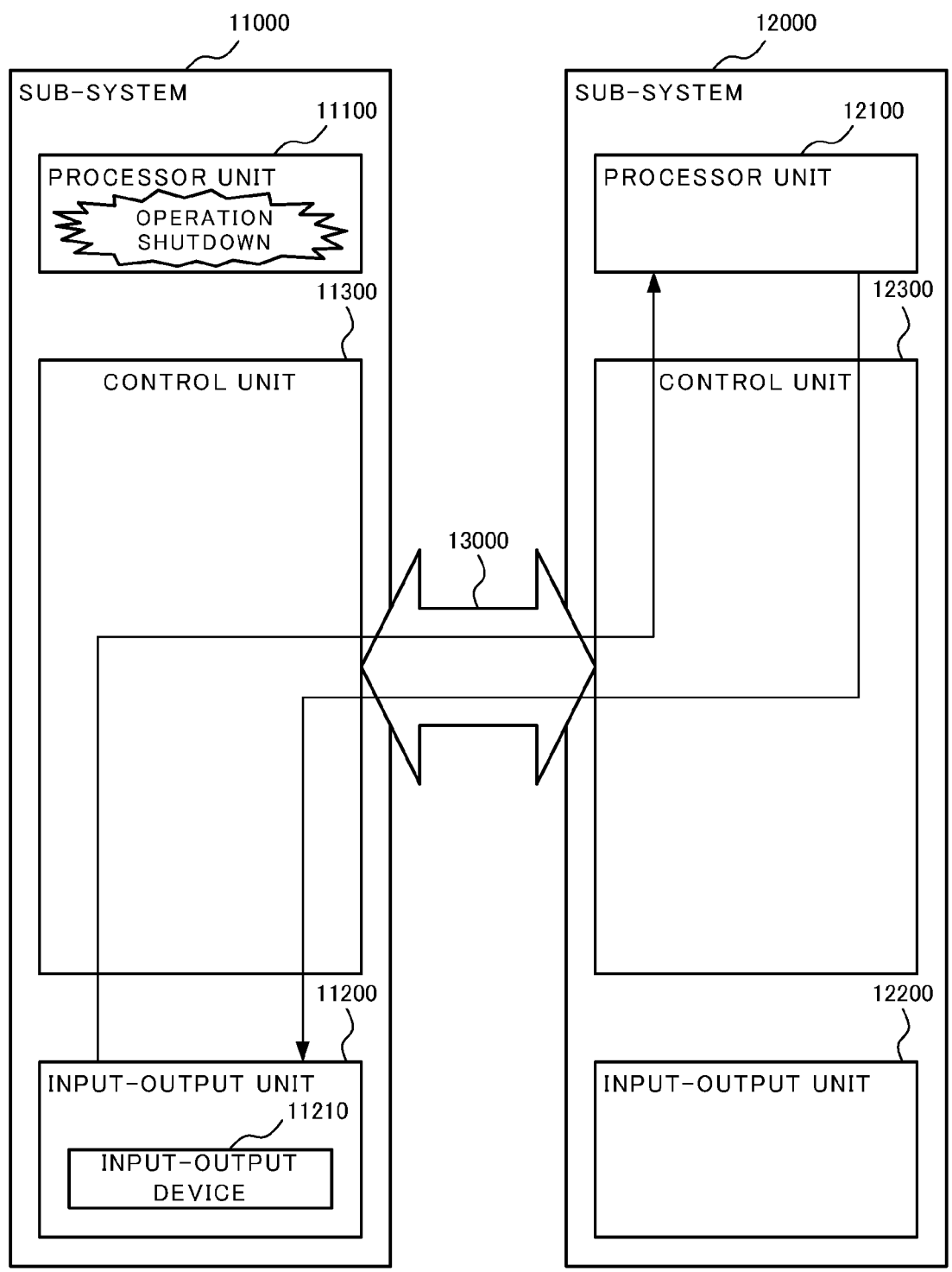
FIG. 4 is a diagram illustrating an example of an operation in a lockstep asynchronous state in the first exemplary embodiment of the invention.

FIG. 4 shows a data flow on an occasion when the processor unit 12100 generates data to access an input-output device 11210 in the input-output unit 11200. FIG. 4 also shows a data flow on an occasion when the input-output device 11210 generates response data in response to the access data. The processor units 11100 and 12100 are in the lockstep asynchronous state. When receiving the data addressed to the input-output device 11210 in the input-output unit 11200 from the processor unit 12100, the control unit 12300 transmits the received data to the control unit 11300 through the signal transmission path 13000. The control unit 11300 transmits the received data to the input-output device 11210 in the input-output unit 11200.

The input-output device 11210 receives the above-described data, performs operations according to the above-described data, generates the result of the operations as response data, and transmits the generated response data to the control unit 11300. Since the processor unit 11100 is in the lockstep asynchronous state, in which the unit 11100 does not work, when receiving the data from the input-output device 11210, the control unit 11300 transfers the received data to the control unit 12300 through the signal transmission path 13000. The control unit 12300 further transfers the transferred data to the processor unit 12100.

As described above, when the processor units 11100 and 12100 are in the lockstep asynchronous state, the data addressed to the input-output device 11210 is transmitted from the processor unit 12100 through the signal transmission path 13000.

Figure 5:
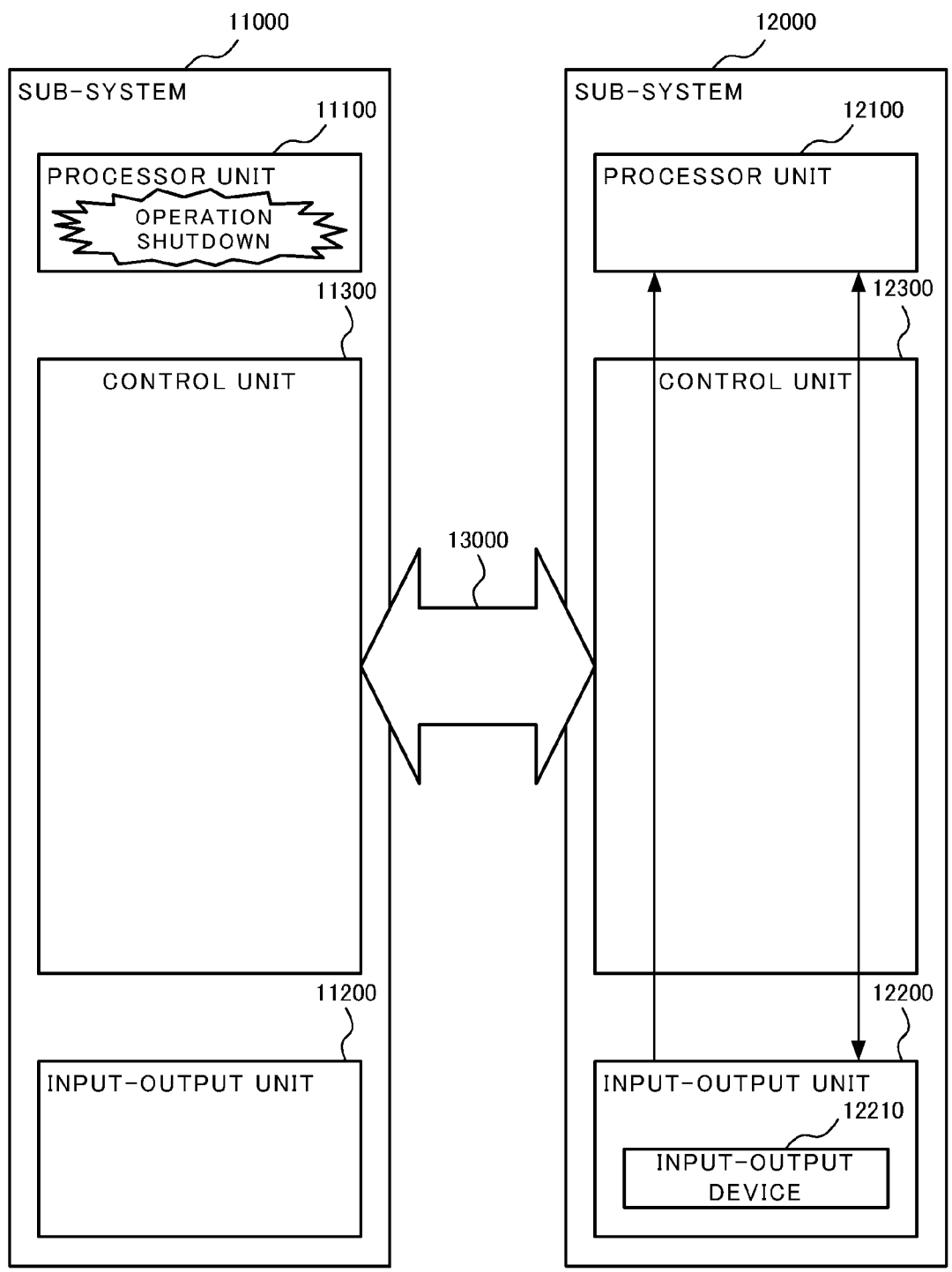
FIG. 5 is a diagram illustrating another example of an operation in the lockstep asynchronous state in the first exemplary embodiment of the invention.

FIG. 5 shows a data flow on an occasion when the processor unit 12100 generates data to access the input-output device 12210 in the input-output unit 12200. FIG. 5 also shows a data flow on an occasion when the input-output device 12210 generates response data in response to the access data. When receiving the data addressed to the input-output device 12210 in the input-output unit 12200 from the processor unit 12100, the control unit 12300 transmits the data to the input-output device 12210 in the input-output unit 12200. Since the processor unit 11100 is in the lockstep asynchronous state in which the unit 11100 does not work, the control unit 12300 does not perform transmission through the signal transmission path 13000.

The input-output device 12210 receives the above-described data, performs processing according to the above-described data, generates the result of the operations as response data, and transmits the generated response data to the control unit 12300. Therefore, when receiving the data from the input-output device 12210, the control unit 12300 transfers the received data to the processor unit 12100. Since the processor unit 11100 is in the lockstep asynchronous in which the unit 11100 does not work, the control unit 12300 does not perform transmission through the signal transmission path 13000.

As described above, according to the invention, it is possible to operate the fault tolerant system in the lockstep synchronous state and in the lockstep asynchronous state, while decreasing amounts of data which flows through the signal transmission path 13000 connecting the sub-systems with each other.

That is because the control units 11300 and 12300 transmit the error detection data to their companion sub-system when the processor units 11100 and 12100 are in the lockstep synchronous state. The control units 11300 and 12300 generate the error detection data from the data of accessing from the processor unit to the input-output unit in one sub-system. That is because, when the processor units 11100 and 12100 are in the lockstep asynchronous state, the control units 11300 and 12300 transmit the data of accessing from the processor unit to the input-output unit in their own sub-system to their companion sub-system.

<Second Exemplary Embodiment>

A second exemplary embodiment of the invention is explained below. A problem to be solved by the exemplary embodiment is initially described.

Figure 17A:
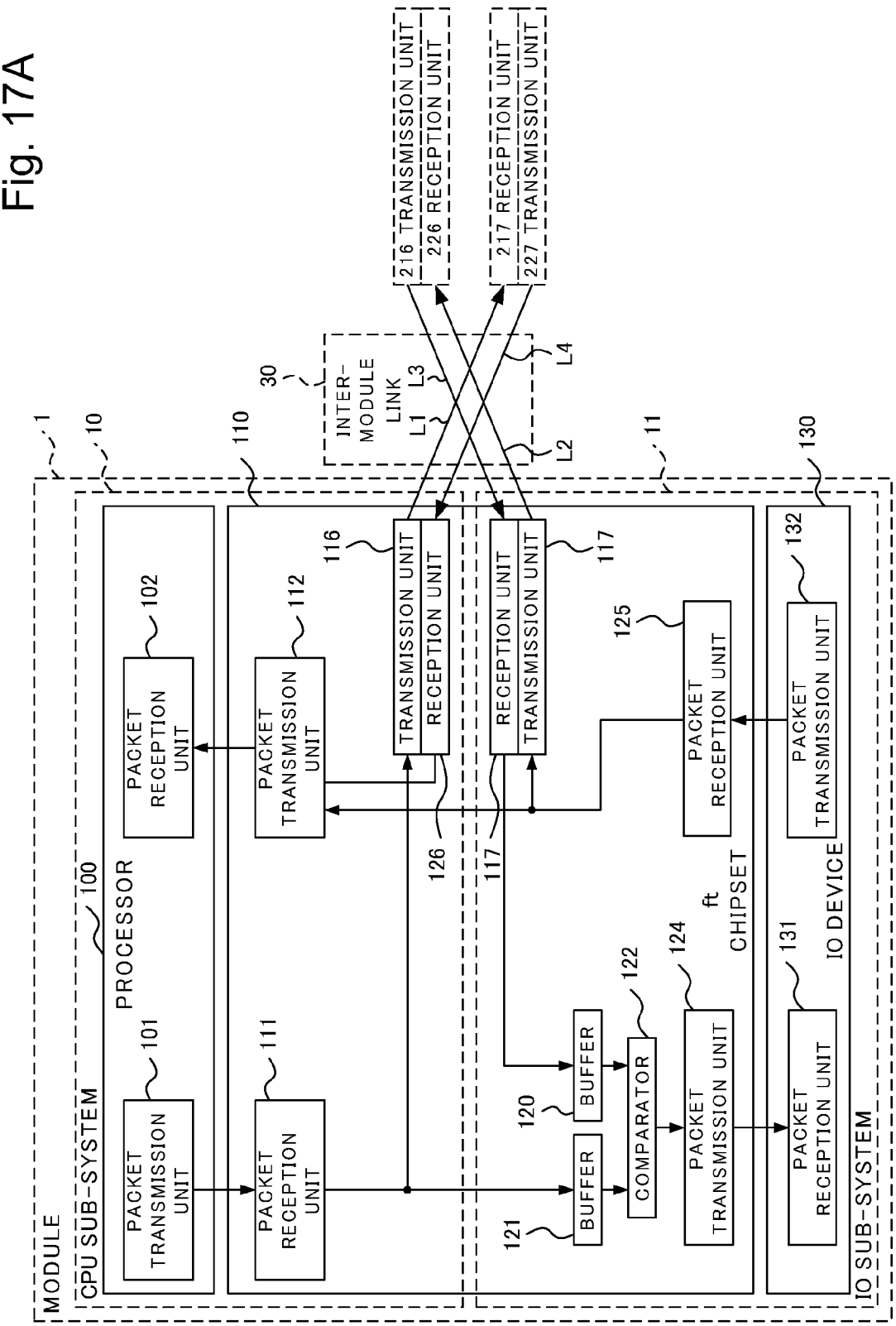
FIG. 17A is a first block diagram illustrating an example of a second fault tolerant system related to the invention.
Figure 17B:
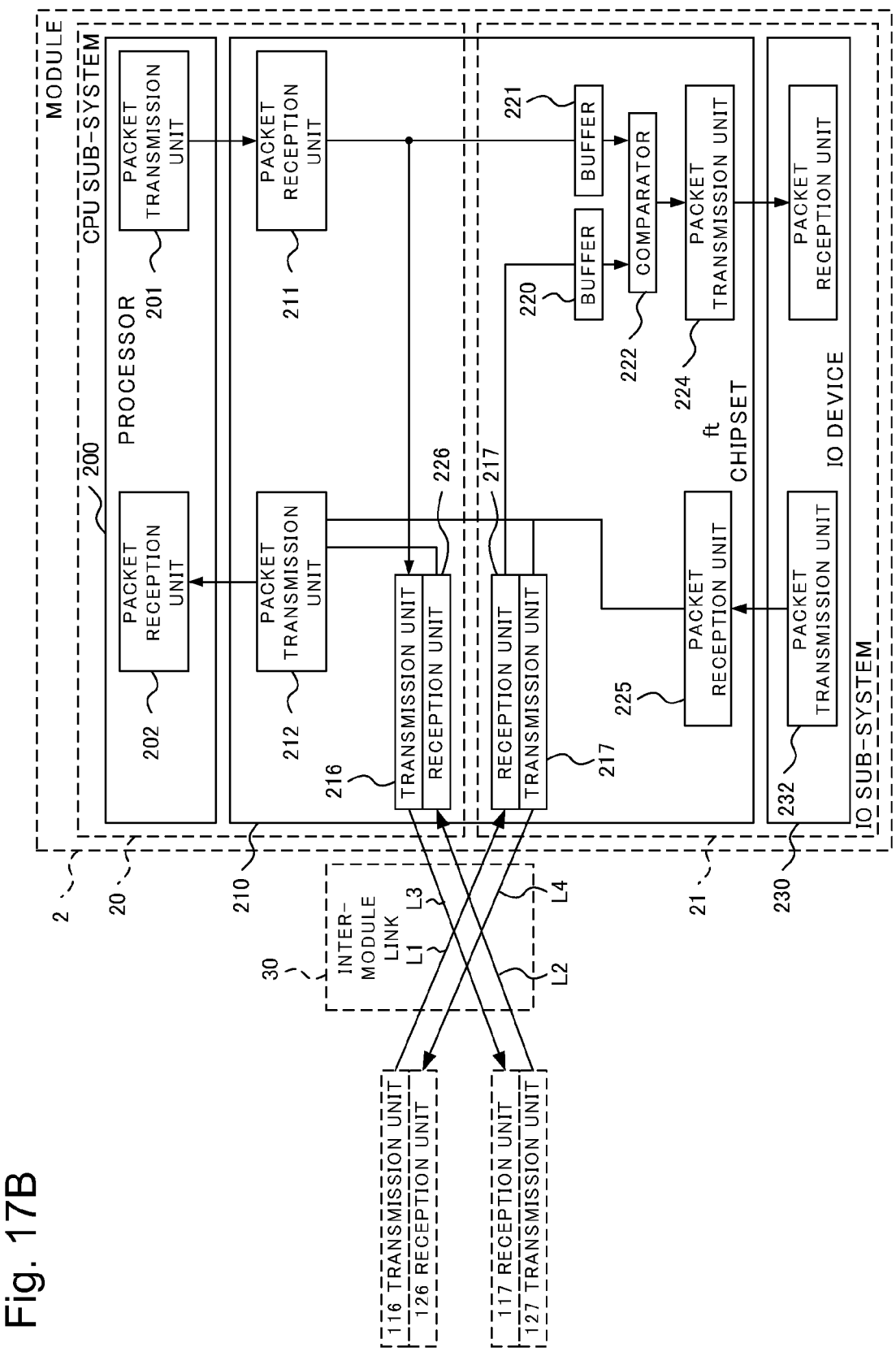
FIG. 17B is a second block diagram illustrating the example of the second fault tolerant system related to the invention.

A crosslink connecting redundant sub-systems used in the fault tolerant system with each other may be composed using four signal transmission paths (link), as shown in FIG. 17 which is a configuration diagram of the second fault tolerant system related to the invention. This is not described in Patent Literatures 1 to 3 in detail, but illustrated, for example, in FIG. 1 of Patent Literature 4 (Japanese Patent Application Laid-open No. 2006-178618).

(1) a signal transmission path L1 for transmitting data of accessing from a CPU sub-system 10 of a module 1 to an IO sub-system 21 of a module 2, (2) a signal transmission path L2 for transmitting data of accessing from an IO sub-system 11 of the module 1 to a CPU sub-system 20 of the module 2, (3) a signal transmission path L3 for transmitting data of accessing from the CPU sub-system 20 of the module 2 to the IO sub-system 11 of the module 1, (4) a signal transmission path L4 for transmitting data of accessing from the IO sub-system 21 of the module 2 to the CPU sub-system 10 of the module 1, When the CPU sub-systems 10 and 20 perform the lockstep operations, packets, amounts of which are similar to amounts of packets which are transmitted from a processor 100 to a ft chipset 110, flow through the signal transmission path L1. Packets, amounts of which are similar to amounts of packets which are transmitted from a processor 200 to a ft chipset 210, flow through the signal transmission path L3. Packets, amounts of which are similar to amounts of packets which are transmitted from an IO device 130 to the processor 100 through the ft chipset 110, flow through the signal transmission path L2. Packets, amounts of which are similar to amounts of packets which are transmitted from an IO device 230 to the processor 200 through the ft chipset 210, flow through the signal transmission path L4. A width of a band of an inter-module link is similar to a width of a band of the link between the processor and the ft chipset. For example, if the processor and the ft chipset are linked via PCI-Express5.0GT/sx4, the CPU sub-system in one module and the IO sub-system in another module are connected by the link having a data transfer band whose width is similar to that of PCI-Express5.0GT/sx4.

In these days, a width of a band required for the link between the processor and the ft chipset is increased, as higher IO quality is required. Consequently broader band is necessary for the inter-module link. Therefore it is required that transfer speed of the inter-module link is increased or a link width is widened. However, the cost of examining signal integrity is however increased, when the transfer speed of the inter-module link is increased. The cost of the ft chipset increases if the link width is widened. In order to suppress rising of the cost, a method of achieving higher IO performance is required without widening the band required for the inter-module link.

In the first related technology related to the invention, checksum generated from packets, which is not the packet itself, is transmitted to another sub-system (i.e. a companion sub-system, as described above) through the crosslink. According to the first related technology, the generated checksum is compared with checksum received from the companion sub-system through the crosslink, and mismatch of operations in the sub-system is detected. The first related technology can be applied to the second fault tolerant system related to the invention shown in FIG. 17. By performing such application, amounts of data which flows through the signal transmission paths L1 and L3 while the CPU sub-systems 10 and 20 perform the lockstep operations can be decreased compared with transmission of the packet itself. However, the signal transmission paths L1 and L3 are used when the CPU sub-systems 10 and 20 perform the lockstep operations, and further when the lockstep operations are not performed. For example, the signal transmission path L1 is used for transmitting the packet generated in the processor 100 in order to control the IO sub-system 230 of the module 2 from the CPU sub-system 10 when the CPU sub-system 20 is shutoff. The signal transmission path L3 is used for transmitting the packet generated in the processor 200 in order to control the IO sub-system 130 of module 1 from the CPU sub-system 20 when the CPU sub-system 10 is shutoff. Therefore, even though the band required for lockstep operations is just narrowed, the band required for the signal transmission paths L1 and L3 cannot be decreased.

An object of the exemplary embodiment is to provide a fault tolerant system solving the above-described problem, in which it is difficult to decrease the band required for the signal transmission path connecting the sub-systems with each other.

Figure 6:
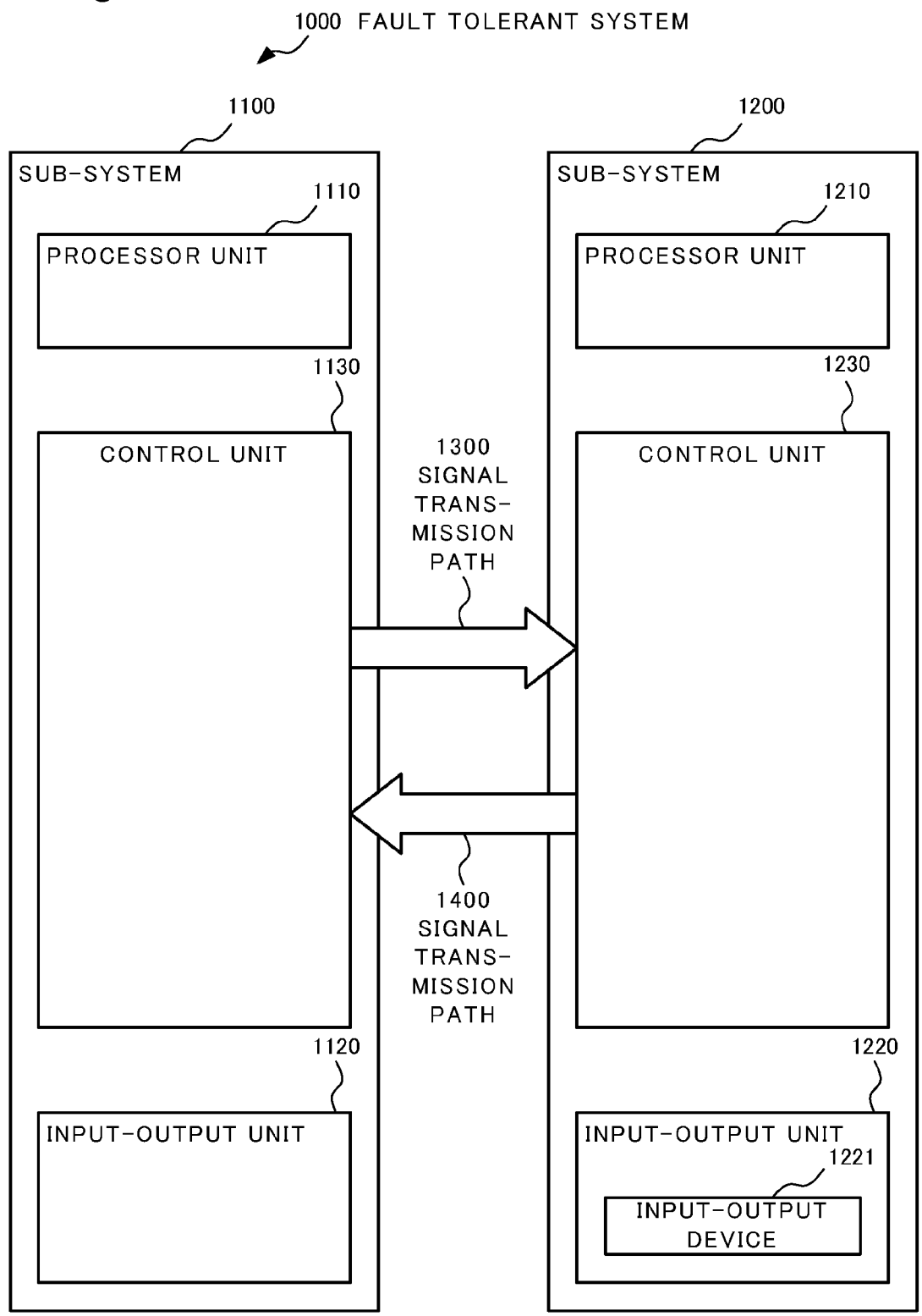
FIG. 6 is a block diagram illustrating an example of a second exemplary embodiment of the invention.

With reference to FIG. 6, a fault tolerant system 1000 of the second exemplary embodiment of the invention includes two sub-systems 1100 and 1200 each of which are composed using identical hardware (i.e. each of which has identical hardware).

The subsystem 1100 includes a processor unit 1110, an input-output unit 1120 connected with the processor unit 1110, a control unit 1130 connected between the processor unit 1110 and the input-output unit 1120. The subsystem 1200 includes a processor unit 1210, an input-output unit 1220 connected with the processor unit 1210, a control unit 1230 connected between the processor unit 1210 and the input-output unit 1220. Two signal transmission paths 1300 and 1400 are provided between the sub-system 1100 and the sub-system 1200. Two signal transmission paths 1300 and 1400 connect the sub-system 1100 and the sub-system 1200 with each other through control units 1130 and 1230.

The processor unit 1110 and the processor unit 1210 are operable in a state where the sub-system 1100 and the sub-system 1200 perform lockstep operations (in the lockstep synchronous state). The processor unit 1110 and the processor unit 1210 are also operable in a state where the sub-system 1100 and the sub-system 1200 do not perform the lockstep operations (in the lockstep asynchronous state), respectively.

The control units 1130 and 1230 include following functions.

When the processor units 1110 and 1210 are in the lockstep synchronous state, in accordance with control by the control units 1130 and 1230, both the error detection data and the data of accessing from the input-output unit 1120 are transmitted through the signal transmission path 1300. The error detection data transmitted through the signal transmission path 1300 is generated, by the control unit 1130, from the data of accessing from the processor unit 1110 of the sub-system 1100 to the input-output unit 1220 of the sub-system 1200 through the control units 1130 and 1230. The data which is the data of accessing from the input-output unit 1120 and is transmitted through the signal transmission path 1300 is the data of accessing from the input-output unit 1120 of the sub-system 1100 to the processor unit 1210 of the sub-system 1200. When the processor units 1110 and 1210 are in the lockstep synchronous state, in accordance with control by the control units 1130 and 1230, both the error detection data and the data of accessing from the input-output unit 1220 are transmitted through the signal transmission path 1400. The error detection data transmitted through the signal transmission path 1400 is generated, by the control unit 1230, from the data of accessing from the processor unit 1210 of the sub-system 1200 to the input-output unit 1120 of the sub-system 1100. The data which is the data of accessing from the input-output unit 1220 and is transmitted through the signal transmission path 1400 is the data of accessing from the input-output unit 1220 of the sub-system 1200 to the processor unit 1110 of the sub-system 1100.

A type of the error detection data and a generating method thereof may be arbitrarily selected. If data of accessing from the processor unit to the input-output unit includes CRC (Cyclic Redundancy Check) in addition to original data of the data, the control units 1130 and 1230 may use the CRC as the error detection data. The control units 1130 and 1230 may calculate checksum on the basis of the data of accessing from the processor unit to the input-output unit. The control units 1130 and 1230 may use the calculated checksum as the error detection data.

When the processor units 1110 and 1210 are in the lockstep asynchronous state, in accordance with control by the control units 1130 and 1230, one of the data of accessing from the processor unit 1110 and the data of accessing from the input-output unit 1120 is transmitted through the signal transmission path 1300. The data which is the data of accessing from the processor unit 1110 and is transmitted through the signal transmission path 1300 is the data of accessing from the processor unit 1110 of the sub-system 1100 to the input-output unit 1220 of the sub-system 1200. The data which is the data of accessing from the input-output unit 1120 and is transmitted through the signal transmission path 1300 is the data of accessing from the input-output unit 1120 of the sub-system 1100 to the processor unit 1210 of the sub-system 1200. When the processor units 1110 and 1210 are in the lockstep asynchronous state, in accordance with control by the control units 1130 and 1230, one of the data of accessing from the processor unit 1210 and the data of accessing from the input-output unit 1220 is transmitted through the signal transmission path 1400. The data which is the data of accessing from the processor unit 1210 and is transmitted through the signal transmission path 1400 is the data of accessing from the processor unit 1210 of the sub-system 1200 to the input-output unit 1120 of the sub-system 1100 through the control units 1130 and 1230. The data which is the data of accessing from the input-output unit 1220 and is transmitted through the signal transmission path 1400 is the data of accessing from the input-output unit 1220 of the sub-system 1200 to the processor unit 1110 of the sub-system 1100.

When the processor units 1110 and 1210 are in the lockstep asynchronous state, one of the processor units is shutoff in the main. If the processor unit 1210 is shutoff, the processor unit 1110 accesses the input-output units 1120 and 1220. The data of accessing from the processor unit 1110 to the input-output unit 1220 is transmitted through the signal transmission path 1300. The data of accessing from the input-output unit 1220 to the processor unit 1110 is transmitted through the signal transmission path 1400. Since the processor 1210 is shutoff, the data of accessing from the processor unit 1210 to the input-output unit 1120 through the signal transmission path 1400 is not transmitted. The data of accessing from the input-output unit 1120 to the processor unit 1210 through the signal transmission path 1300 is not transmitted.

Operations of the fault tolerant system 1000 of the exemplary embodiment are explained below.

Operations which are explained in the follows are operations performed when the processor units 1110 and 1210 are in the lockstep synchronous state.

Figure 7:
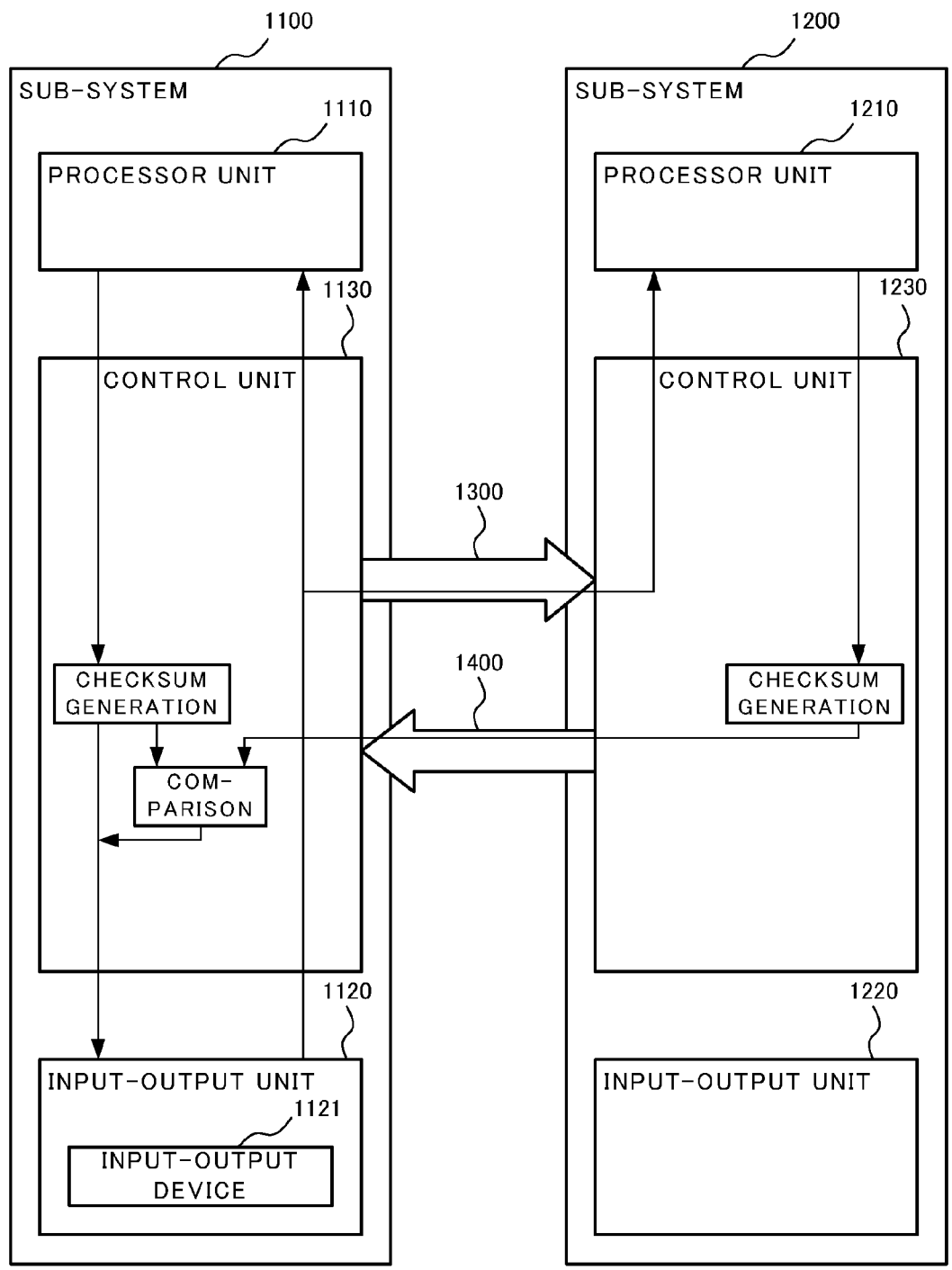
FIG. 7 is a diagram illustrating an example of an operation in the lockstep synchronous state in the second exemplary embodiment of the invention.

FIG. 7 shows a data flow on an occation when the processor unit 1110 and the processor unit 1210 generate data of accessing an input-output device 1121 in the input-output unit 1120. FIG. 7 also shows a data flow on an occasion when the input-output device 1121 generates response data in response to the access data. The processor units 1110 and 1210 are in the lockstep synchronous state. When receiving data addressed to the input-output device 1121 in the input-output unit 1120 from the processor unit 1110, the control unit 1130 generates the error detection data from the received data. The control unit 1130 accumulates the received data i.e. original data and the generated error detection data in a buffer in the control unit 1130 to temporarily store the original data and the error detection data thereof. When receiving data addressed to the input-output device 1121 from the processor unit 1210, the control unit 1230 generates the error detection data from the data. The control unit 1230 transmits the generated error detection data to the control unit 1130 through the signal transmission path 1400. The control unit 1130 compares the error detection data accumulated in the buffer with the error detection data received from the control unit 1230 through the signal transmission path 1400. Only when both the error detection data accumulated in the buffer and the error detection data received from the control unit 1230 through the signal transmission path 1400 coincide with each other, the control unit 1130 transmits data addressed to the input-output device 1121 stored in the buffer to the input-output device 1121 in the input-output unit 1120. Thereby the control unit 1130 and the control unit 1230 avoid a case in which the input-output device 1121 is accessed under an improper condition where both the error detection data accumulated in the buffer and the error detection data received from the control unit 1230 through the signal transmission path 1400 do not coincide with each other.

The input-output device 1121 receives the above-described data, performs operations according to the above-described data, generates the result of the operations as response data, and transmits the generated response data to the control unit 1130. The processor units 1110 and 1210 are in the lockstep synchronous state. Therefore, when receiving the data from the input-output device 1121, the control unit 1130 transfers the received data to the processor unit 1110. The control unit 1130 further transfers the received data to the control unit 1230 through the signal transmission path 1300. The control unit 1230 further transfers the transferred data to the processor unit 1210.

As described above, when the processor units 1110 and 1210 are in the lockstep synchronous state, the data addressed to the input-output device 1121 from the processor unit 1210 is not transmitted to the signal transmission path 1400. The error detection data generated from the data is transmitted to the signal transmission path 1400. The data generated by the input-output device 1121 is transmitted to the signal transmission path 1300.

Figure 8:
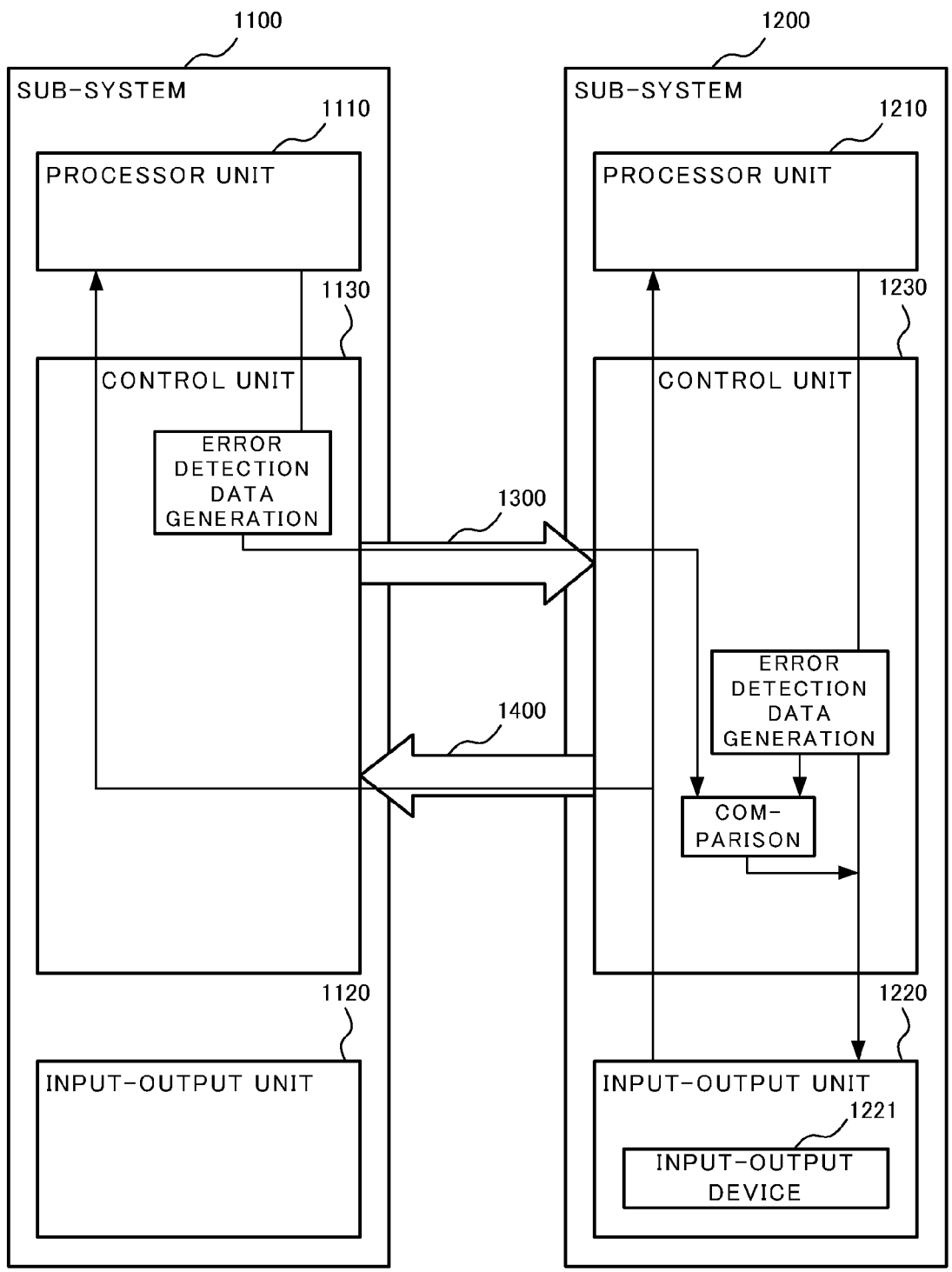
FIG. 8 is a diagram illustrating another example of an operation in the lockstep synchronous state in the second exemplary embodiment of the invention.

FIG. 8 shows a data flow on an occasion when the processor unit 1110 and the processor unit 1210 generate data to access an input-output device 1221 in the input-output unit 1220. FIG. 8 also shows data flow on an occasion when the input-output device 1221 generates response data in response to the access data. The processor units 1110 and 1210 are in the lockstep synchronous state. When receiving data addressed to the input-output device 1221 in the input-output unit 1120 from the processor unit 1210, the control unit 1230 generates the error detection data from the received data. The control unit 1230 accumulates the received data i.e. original data and the generated error detection data in a buffer in the control unit 1230 to temporarily store the original data and the error detection data thereof. When receiving data addressed to the input-output device 1221 from the processor unit 1110, the control unit 1130 generates the error detection data from the data. The control unit 1130 transmits the generated error detection data to the control unit 1230 through the signal transmission path 1300. The control unit 1230 compares the error detection data accumulated in the buffer with the error detection data received from the control unit 1130 through the signal transmission path 1300. Only when both the error detection data accumulated in the buffer with the error detection data received from the control unit 1130 through the signal transmission path 1300 coincide with each other, the control unit 1230 transmits data addressed to the input-output device 1221 stored in the buffer to the input-output device 1221 in the input-output unit 1220. Thereby the control unit 1130 and the control unit 1230 avoid a case in which the input-output device 1221 is accessed under an improper condition where both the error detection data do not coincide with each other.

The input-output device 1221 receives the above-described data, performs operations according to the above-described data, generates the result of the operations as response data, and transmits the generated response data to the control unit 1230. The processor units 1110 and 1210 are in the lockstep synchronous state. Therefore, when receiving the data from the input-output device 1221, the control unit 1230 transfers the received data to the processor unit 1210. The control unit 1230 also transfers the received data to the control unit 1130 through the signal transmission path 1400. The control unit 1130 further transfers the transferred data to the processor unit 1110.

As described above, when the processor units 1110 and 1210 are in the lockstep synchronous state, the data addressed to the input-output device 1221 from the processor unit 1110 is not transmitted through the signal transmission path 1300. The error detection data generated from the data is transmitted through the signal transmission path 1300. The data generated by the input-output device 1221 is transmitted through the signal transmission path 1400.

When the input-output unit 1120 and the input-output unit 1220 are currently used, operations shown in FIG. 7 and operations shown in FIG. 8 are performed in parallel. When the maximum value of amounts of the error detection data which flows through each of the signal transmission paths 1300 and 1400 is X, and the maximum value of amounts of data generated in the input-output unit is Y, a maximum value of amounts of the data which flows through each of the signal transmission paths 1300 and 1400 is X+Y.

Operations which are explained in the following are operations performed when the processor units 1110 and 1210 are in the lockstep asynchronous state. As an example, suppose that the processor unit 1110 stops operations thereof for some reason, like a fault, and the processor unit 1210 continues the operations. In this case, only the processor unit 1210 generates the data of accessing the input-output unit 1120 and the input-output unit 1220.

Figure 9:
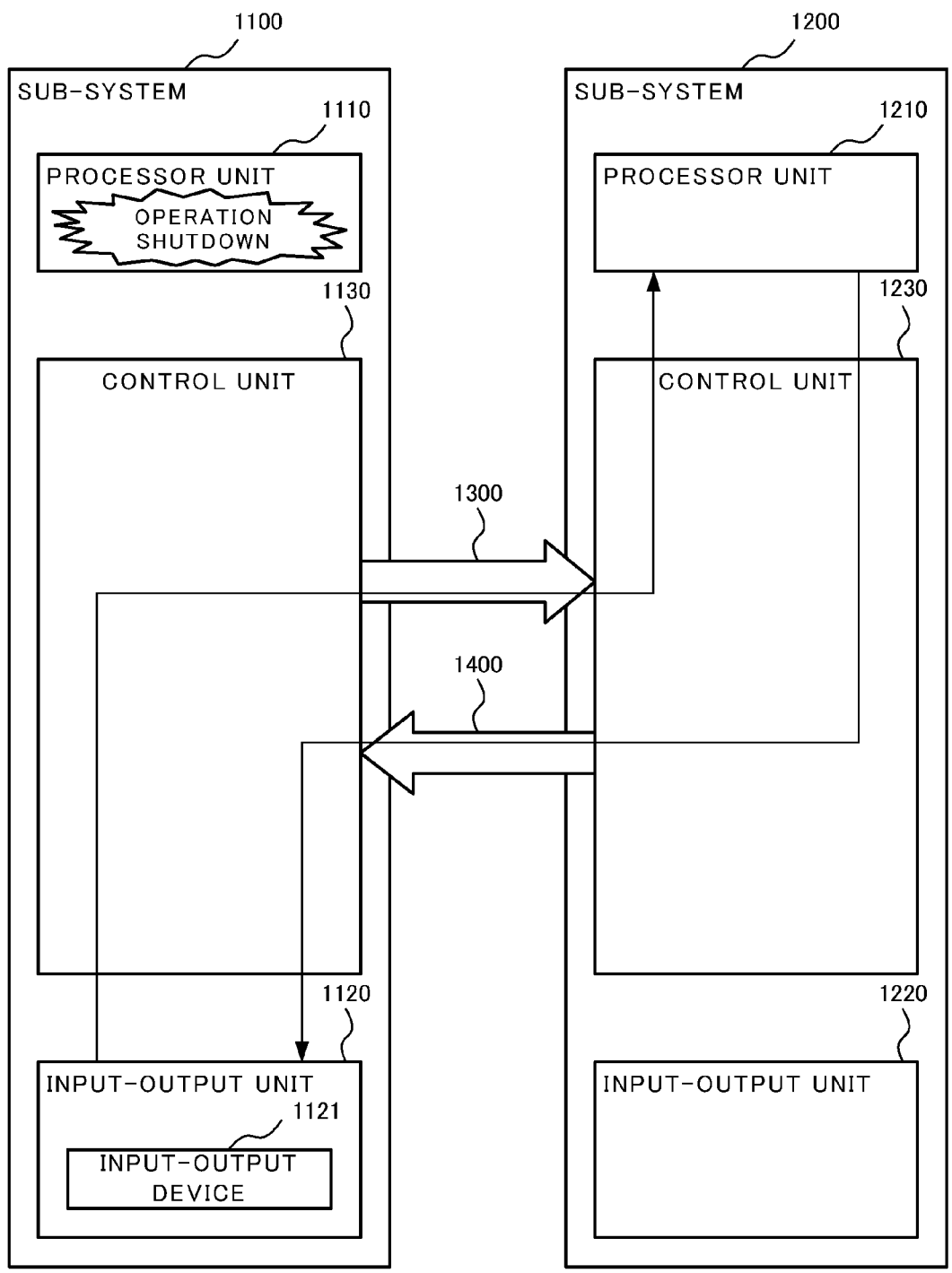
FIG. 9 is a diagram illustrating an example of an operation in the lockstep asynchronous state in the second exemplary embodiment of the invention.

FIG. 9 shows a data flow on an occasion when the processor unit 1210 generates data of accessing an input-output device 1121 in the input-output unit 1120. FIG. 9 also shows a data flow on an occasion when the input-output device 1121 generates response data in response to the access data. The processor units 1110 and 1210 are in the lockstep asynchronous state. When receiving data addressed to the input-output device 1121 in the input-output unit 1120 from the processor unit 1210, the control unit 1230 transmits the received data to the control unit 1130 through the signal transmission path 1400. The control unit 1130 also transmits the received data to the input-output device 1121 in the input-output unit 1120.

The input-output device 1121 receives the above-described data, performs operations according to the above-described data, generates the result of the operations as response data, and transmits the generated response data to the control unit 1130. The processor unit 1110 is in the lockstep asynchronous state in which the unit 1110 does not work. Therefore, when receiving the data from the input-output device 1121, the control unit 1130 transfers the received data to the control unit 1230 through the signal transmission path 1300. The control unit 1230 further transfers the transferred data to the processor unit 1210.

As described above, when the processor units 1110 and 1210 are in the lockstep asynchronous state, the data itself addressed to the input-output device 1121 is transmitted from the processor unit 1210 through the signal transmission path 1400. The data generated by the input-output device 1121 is transmitted through the signal transmission path 1300.

Figure 10:
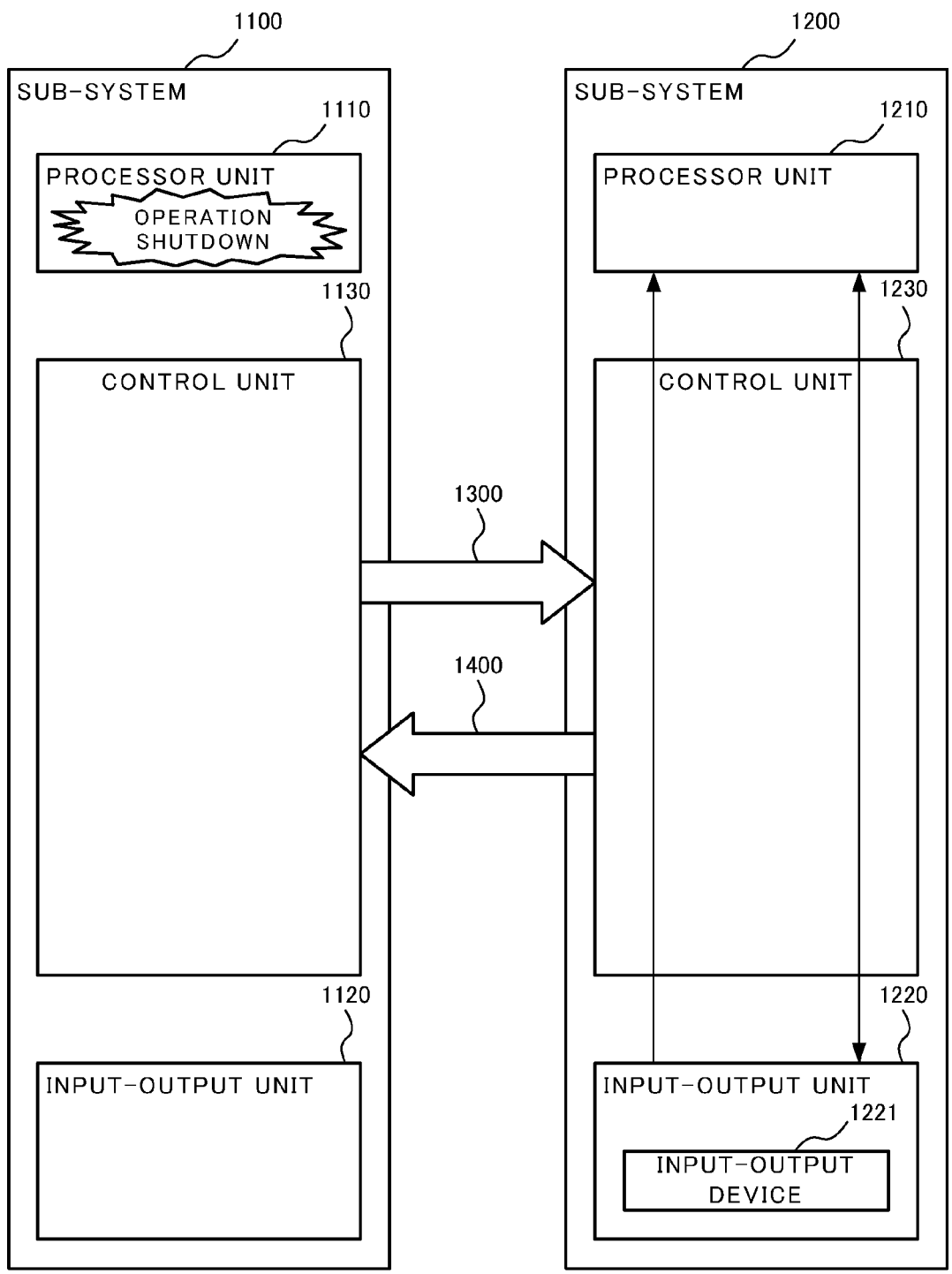
FIG. 10 is a diagram illustrating another example of an operation in the lockstep asynchronous state in the second exemplary embodiment of the invention.

FIG. 10 shows a data flow which is occurred when the processor unit 1210 generates data to access the input-output device 1221 in the input-output unit 1220. FIG. 10 also shows a data flow which is occurred when the input-output device 1221 generates response data in response to the access data. When receiving the data addressed to the input-output device 1221 in the input-output unit 1220 from the processor unit 1210, the control unit 1230 transmits the data to the input-output device 1221 in the input-output unit 1220. Since the processor unit 1110 is in the lockstep asynchronous in which the unit 1110 does not work, the control unit 1230 does not perform transmission through the signal transmission path 1400.

The input-output device 1221 receives the above-described data, performs operations according to the above-described data, generates the result of the operations as response data, and transmits the generated response data to the control unit 1230. Therefore, when receiving the data from the input-output device 1221, the control unit 1230 transfers the received data to the processor unit 1210. Since the processor unit 1110 is in the lockstep asynchronous state in which the unit 1110 does not work, the control unit 1230 does not perform transmission through the signal transmission path 1400.

As described above, when the processor units 1110 and 1210 are in the lockstep asynchronous state, the signal transmission path 1400 is not used when the input-output device 1221 is accessed from the processor unit 1210. When the input-output device 1221 generates data, the signal transmission path 1400 is not used.

When the input-output unit 1120 and the input-output unit 1220 are currently used, operations shown in FIG. 9 and operations shown in FIG. 10 are performed in parallel. The maximum value of amounts of data of accessing the input-output unit from the processor unit is almost the same as the maximum value of amounts of data generated in the input-output unit. Therefore the maximum value of data which flow through the signal transmission paths 1300 and 1400 is Y.

For comparison, a first fault tolerant system related to the invention is explained in the following. As shown in FIG. 13 to FIG. 16, following four signal transmission paths connect the sub-system 1100 and the sub-system 1200 in the first fault tolerant system.

(1) a signal transmission path 1310 for transmitting data of accessing from the processor unit 1110 of the sub-system 1100 to the input-output unit 1220 of the sub-system 1200, (2) a signal transmission path 1320 for transmitting data of accessing from the input-output unit 1120 of the sub-system 1100 to the processor unit 1210 of the sub-system 1200, (3) a signal transmission path 1410 for transmitting data of accessing from the processor unit 1210 of the sub-system 1200 to the input-output unit 1120 of the sub-system 1100.

(4) a signal transmission path 1420 for transmitting data of accessing from the input-output unit 1220 of the sub-system 1200 to the processor unit 1110 of the sub-system 1100, First, operations which are performed when the processor units 1110 and 1210 are in the lockstep synchronous state are explained.

Figure 13:
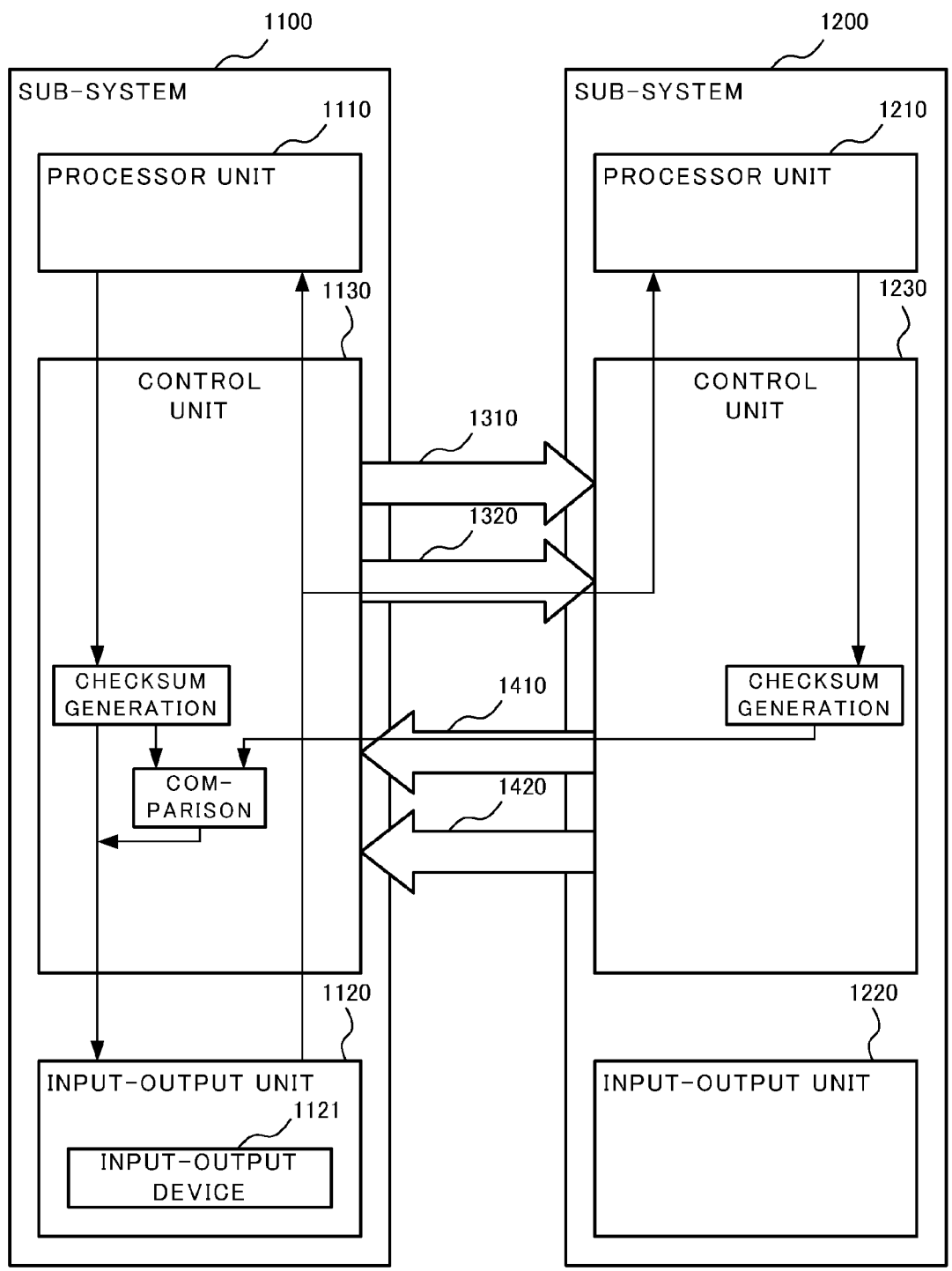
FIG. 13 is a diagram illustrating an example of an operation in the lockstep synchronous state in a first fault tolerant system related to the invention.

FIG. 13 shows a data flow on an occasion when the processor units 1110 and 1210 generate data to access an input-output device 1121 in the input-output unit 1120. FIG. 13 also shows a data flow on an occasion when the input-output device 1121 generates response data in response to the access data. The processor units 1110 and 1210 are in the lockstep synchronous state. When receiving data addressed to the input-output device 1121 in the input-output unit 1120 from the processor unit 1110, the control unit 1130 generates checksum from the received data. The control unit 1130 accumulates the received data i.e. original data and the generated checksum in a buffer in the control unit 1130 to temporarily store the original data and the checksum thereof. When receiving data addressed to the input-output device 1121 from the processor unit 1210, the control unit 1230 generates checksum from the received data. The control unit 1230 transmits the generated checksum to the control unit 1130 through the signal transmission path 1410. The control unit 1130 compares the checksum accumulated in the buffer with the checksum received from the control unit 1230 through the signal transmission path 1410. The control unit 1230 transmits the data addressed to the input-output device 1121 stored in the buffer to the input-output device 1121 in the input-output unit 1120, only when the checksums coincide with each other.

The input-output device 1121 receives the above-described data, performs operations according to the above-described data, generates the result of the operations as response data, and transmits the generated response data to the control unit 1130. The processor unit 1110 and the processor unit 1210 are in the lockstep synchronous state. Therefore, when receiving data from the input-output device 1121, the control unit 1130 transfers the received data to the processor unit 1110. The control unit 1130 transfers the received data to the processor unit 1230 through the signal transmission path 1320. The control unit 1230 further transmits the transferred data to the processor unit 1210.

Figure 14:
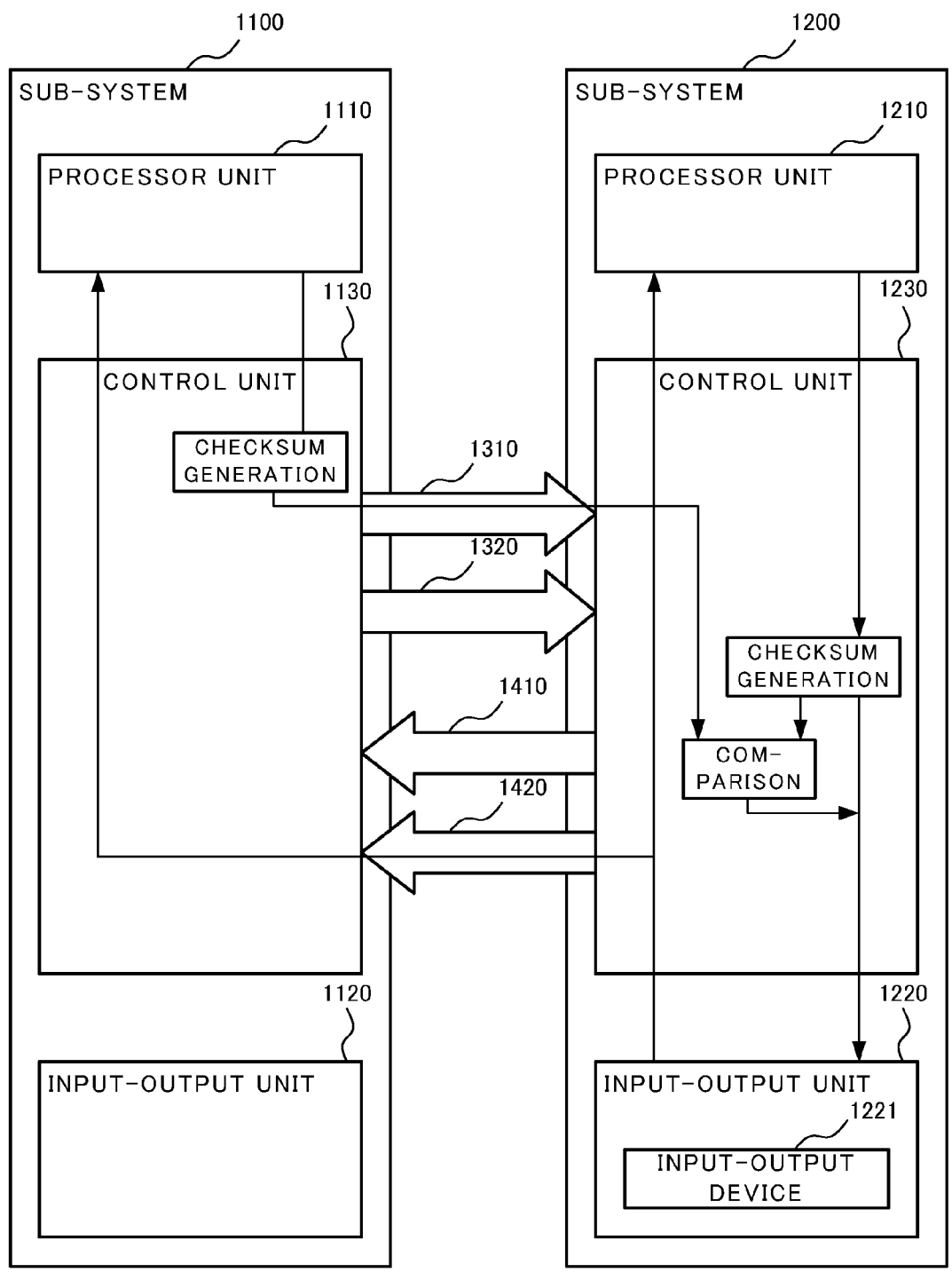
FIG. 14 is a diagram illustrating another example of an operation in the lockstep synchronous state in the first fault tolerant system related to the invention.

FIG. 14 shows a data flow on an occasion when the processor units 1110 and 1210 generate data to access an input-output device 1221 in the input-output unit 1220. FIG. 14 also shows a data flow on an occasion when the input-output device 1221 generates response data in response to the access data. The processor units 1110 and 1210 are in the lockstep synchronous state. When receiving data addressed to the input-output device 1221 in the input-output unit 1220 from the processor unit 1210, the control unit 1230 generates checksum from the received data. The control unit 1230 accumulates the received data i.e. original data and the generated checksum in a buffer in the control unit 1230 to temporarily store the original data and the checksum thereof. When receiving the data addressed to the input-output device 1221 from the processor unit 1110, the control unit 1130 generates checksum from the data. The control unit 1130 transmits the generated checksum to the control unit 1230 through the signal transmission path 1310. The control unit 1230 compares the checksum accumulated in the buffer with the checksum received from the control unit 1130 through the signal transmission path 1310. The control unit 1230 transmits the data addressed to the input-output device 1221 stored in the buffer to the input-output device 1221 in the input-output unit 1220, only when the checksums coincide with each other.

The input-output device 1221 receives the above-described data, performs operations according to the above-described data, generates the result of the operations as response data, and transmits the generated response data to the control unit 1230. The processor unit 1110 and the processor unit 1210 are in the lockstep synchronous state. Therefore, when receiving data from the input-output device 1221, the control unit 1230 transfers the received data to the processor unit 1210. The control unit 1230 transfers the received data to the processor unit 1130 through the signal transmission path 1420. The control unit 1130 further transmits the transferred data to the processor unit 1110.

When the input-output unit 1120 and the input-output unit 1220 are currently used, operations shown in FIG. 13 and operations shown in FIG. 14 are performed in parallel. The maximum value of amounts of data which flow through the signal transmission paths 1310, 1320, 1410, and 1420 is Y.

Operations which are performed when the processor units 1110 and 1210 are in the lockstep asynchronous state are explained below. As an example, suppose that the processor unit 1110 stops the operations thereof for some reason, like a fault, and the processor unit 1210 continues the operations. In this case, only the processor unit 1210 generates the data of accessing the input-output unit 1120 and the input-output unit 1220.

Figure 15:
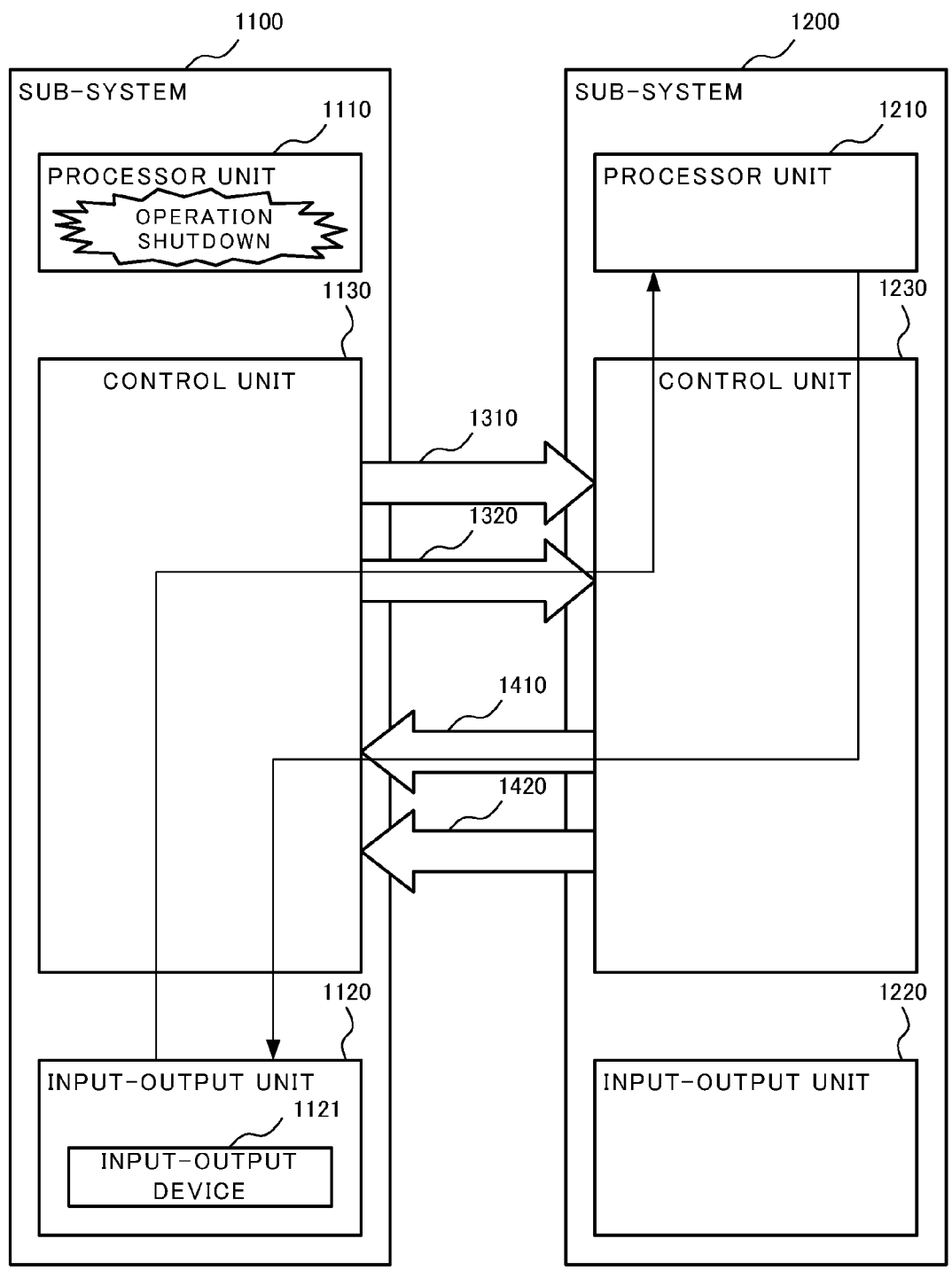
FIG. 15 is a diagram illustrating an example of an operation in the lockstep asynchronous state in the first fault tolerant system related to the invention.

FIG. 15 shows a data flow on an occasion when the processor unit 1210 generates data to access the input-output device 1121 in the input-output unit 1120. FIG. 15 also shows a data flow on an occasion when the input-output device 1121 generates response data in response to the access data. The processor units 1110 and 1210 are in the lockstep asynchronous state. When receiving the data addressed to the input-output device 1121 in the input-output unit 1120 from the processor unit 1210, the control unit 1230 transmits the received data to the control unit 1130 through the signal transmission path 1410. The control unit 1130 transmits the received data to the input-output device 1121 in the input-output unit 1120.

The input-output device 1121 receives the above-described data, performs operations according to the above-described data, generates the result of the operations as response data, and transmits the generated response data to the control unit 1130. The processor unit 1110 is in the lockstep asynchronous state. Therefore, when receiving the data from the input-output device 1121, the control unit 1130 transfers the received data to the control unit 1230 through the signal transmission path 1320. The control unit 1230 further transfers the transferred data to the processor unit 1210.

Figure 16:
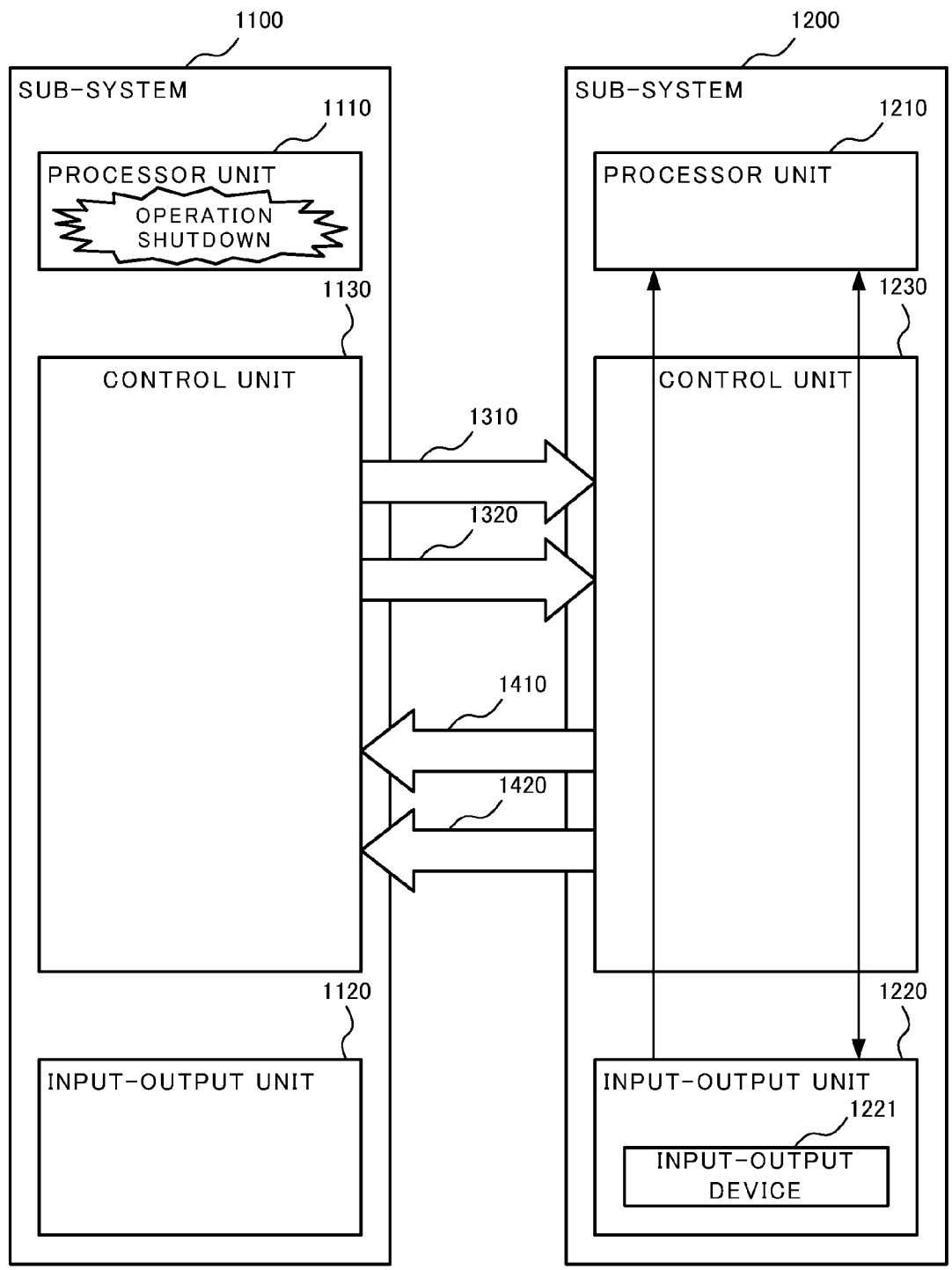
FIG. 16 is a diagram illustrating another example of an operation in the lockstep asynchronous state in the first fault tolerant system related to the invention.

FIG. 16 shows a data flow on an occasion when the processor unit 1210 generates data to access the input-output device 1221 in the input-output unit 1220. FIG. 16 also shows a data flow on an occasion when the input-output device 1221 generates response data in response to the access data. When receiving the data addressed to the input-output device 1221 in the input-output unit 1220 from the processor unit 1210, the control unit 1230 transmits the data to the input-output device 1221 in the input-output unit 1220. Since the processor unit 1110 is in the lockstep asynchronous state in which the unit 1110 does not work, the control unit 1230 does not perform transmission to the signal transmission path 1410.

The input-output device 1221 receives the above-described data, performs operations according to the above-described data, generates the result of the operations as response data, and transmits the generated response data to the control unit 1230. When receiving the data from the input-output device 1221, the control unit 1230 transfers the received data to the processor unit 1210. Since the processor unit 1110 is in the lockstep asynchronous state in which the unit 1110 does not work, the control unit 1230 does not perform transmission to the signal transmission path 1420.

As described above, when the processor units 1110 and 1210 are in the lockstep asynchronous state, the signal transmission path 1410 is not used when the input-output device 1221 is accessed from the processor unit 1210. When the input-output device 1221 generates data, the signal transmission path 1420 is not used.

When the input-output unit 1120 and the input-output unit 1220 are currently used, operations shown in FIG. 15 and operations shown in FIG. 16 are performed in parallel. The maximum value of amounts of data which flow in each of the signal transmission paths 1320 and 1410 is Y. When the processor unit 1210, not the processor unit 1110, stops due to a fault, etc. the maximum value of amounts of data which flow in each of the signal transmission paths 1310 and 1420 is Y.

As shown in FIG. 13 to FIG. 16, in the fault tolerant system where four signal transmission paths connect the sub-system 1100 and the sub-system 1200, a width of the band required for each of the signal transmission paths is Y. In all the sub-systems, the width of the band required for transmitting data from the sub-system 1100 to the sub-system 1200 is 2Y, and the width of the band required for transmitting data from the sub-system 1200 to the sub-system 1100 is 2Y.

In contrast, in the fault tolerant system of the present exemplary embodiment, as shown in FIG. 7 to FIG. 10, two signal transmission paths 1300 and 1400 connect the sub-system 1100 and the sub-system 1200. Data of accessing from the processor unit in one sub-system to the input-output unit in another sub-system and data of accessing from the input-output unit in one sub-system to the processor unit in another sub-system are transmitted by sharing the same signal transmission path. The data of accessing from the processor unit in one sub-system to the input-output unit in another sub-system and data of accessing from the input-output unit in one sub-system to the processor unit in another sub-system are transmitted through the same signal transmission path. In the fault tolerant system of the exemplary embodiment, the width of the band required for transmitting data from the sub-system 1100 to the sub-system 1200 is X+Y. In the fault tolerant system of the exemplary embodiment, the width of the band required for transmitting data from the sub-system 1200 to the sub-system 1100 is also X+Y. X is sufficiently smaller than Y. According to the exemplary embodiment, the width of the band required for the signal transmission path connecting the sub-systems with each other can be substantially decreased.

It is logically possible to separately operate the processor units 1110 and 1210 when the processor units 1110 and 1210 are in the lockstep asynchronous state. In this case, it is logically possible to make the processor unit 1110 perform data transmission between the processor unit 1110 and the input-output unit 1220 of another sub-system. Further, in such case, it is logically possible to make the processor unit 1210 perform data transmission between the processor unit 1210 and the input-output unit 1120 of another sub-system. In this case, the width of the band required for each of the signal transmission paths 1300 and 1400 is 2Y. When the width of the band of each of the signal transmission paths 1300 and 1400 is set to X+Y, it is difficult to achieve operations described above because to shortage of the band. However, such difficulty of the above-described operations does not matter for practical purpose at all, because the form of the above-described operations is unnecessary in actual operations.

<Third Exemplary Embodiment>

A third exemplary embodiment of the invention is described in detail.

A problem to be solved by the exemplary embodiment is initially described by referring to FIG. 17. FIG. 17 shows a configuration of a second fault tolerant system related to the invention which carries out lockstep operations of two modules. In the fault tolerant system, an inter-module link bi-directionally connects a CPU sub-system of one module to an IO sub-system of another module, and an IO sub-system of one module to a CPU sub-system of another module. In this case, a width of a band of an inter-module link is designed to be similar to a width of a band of a link between a processor and a ft chipset. For example, if the processor and the ft chipset are linked according to PCI-Express5.0GT/sx4, the CPU sub-system in one module and the IO sub-system in another module are connected by the link having a data transfer band whose width is similar to that of PCI-Express5.0GT/sx4.

In these days, a width of a band required for the link between the processor and the ft chipset is increased, as higher IO performance is required. Consequently a broader band is necessary for the inter-module link. In order to widen the band, it is required that transfer speed is increased or a link width is widened. However, the cost of examining signal integrity is increased, if the transfer speed is increased. The cost of the ft chipset increases if the link width is widened. In order to suppress rising of the cost, a method of achieving higher IO performance without widening the band required for the inter-module link is necessary.

<Summary of the Third Exemplary Embodiment>

In the third exemplary embodiment, the above-described problem is solved by using following two methods.

A first method is to share the inter-module link. In the second fault tolerant system related to the invention, the inter-module link includes four links. One of the four links is a link from the CPU sub-system of a module 1 to the IO sub-system of a module 2. One of the four links is a link from the IO sub-system of the module 1 to the CPU sub-system of the module 2. One of the four links is a link from the CPU sub-system of the module 2 to the IO sub-system of a module 1. One of the four links is a link from the IO sub-system of the module 2 to the CPU sub-system of the module 1. In the structure of the exemplary embodiment, the inter-module link is reconstructed as two links, i.e. a link from the module 1 to the module 2 and a link from the module 2 to the module 1. Data transfer from the CPU sub-system of the module 1 to the IO sub-system of the module 2 and data transfer from the IO sub-system of the module 1 to the CPU sub-system of the module 2 are performed by sharing the inter-module link.

A second method is to decrease amounts of data transfer to the IO sub-system of another module when the CPU sub-system performs the lockstep operations. In the second fault tolerant system related to the present exemplary embodiment, the CPU sub-system confirms a destination of a packet received from the processor. The CPU sub-system transfers the entirety of the packet to the IO sub-system of the module 1 or the IO sub-system of the module 2. The IO sub-system confirms whether or not a packet received from the CPU sub-system of the module 1 coincides with a packet received from the CPU sub-system of the module 2. The IO sub-system transfers the packet to an IO device. In contract, in the exemplary embodiment, the CPU sub-system confirms a destination of a packet received from the processor. If the destination is that of the IO device of another module and if the CPU sub-system performs the lockstep operations, the CPU sub-system does not transmit the entirety of the packet. In this case, the CPU sub-system transmits a part of the packet or checksum, etc. The checksum, etc. is generated from information of the packet or information of time at which the packet is received, like an exemplary embodiment described below. When only CRC included in the packets is transmitted, the IO sub-system compares CRC received from the CPU sub-system of the module 1 with CRC received from the CPU sub-system of the module 2. If the two CRCs coincide with each other, the IO sub-system transfers, to the IO device, the packet received from the CPU sub-system of the module in which the IO sub-system is included. The CPU sub-system transfers the entirety of the packet to the IO sub-system, if a destination of the packet is one IO sub-system of the module in which the CPU sub-system is included or if the CPU sub-system does not perform the lockstep operations.

<Structure of the Third Exemplary Embodiment>

Figure 11A:
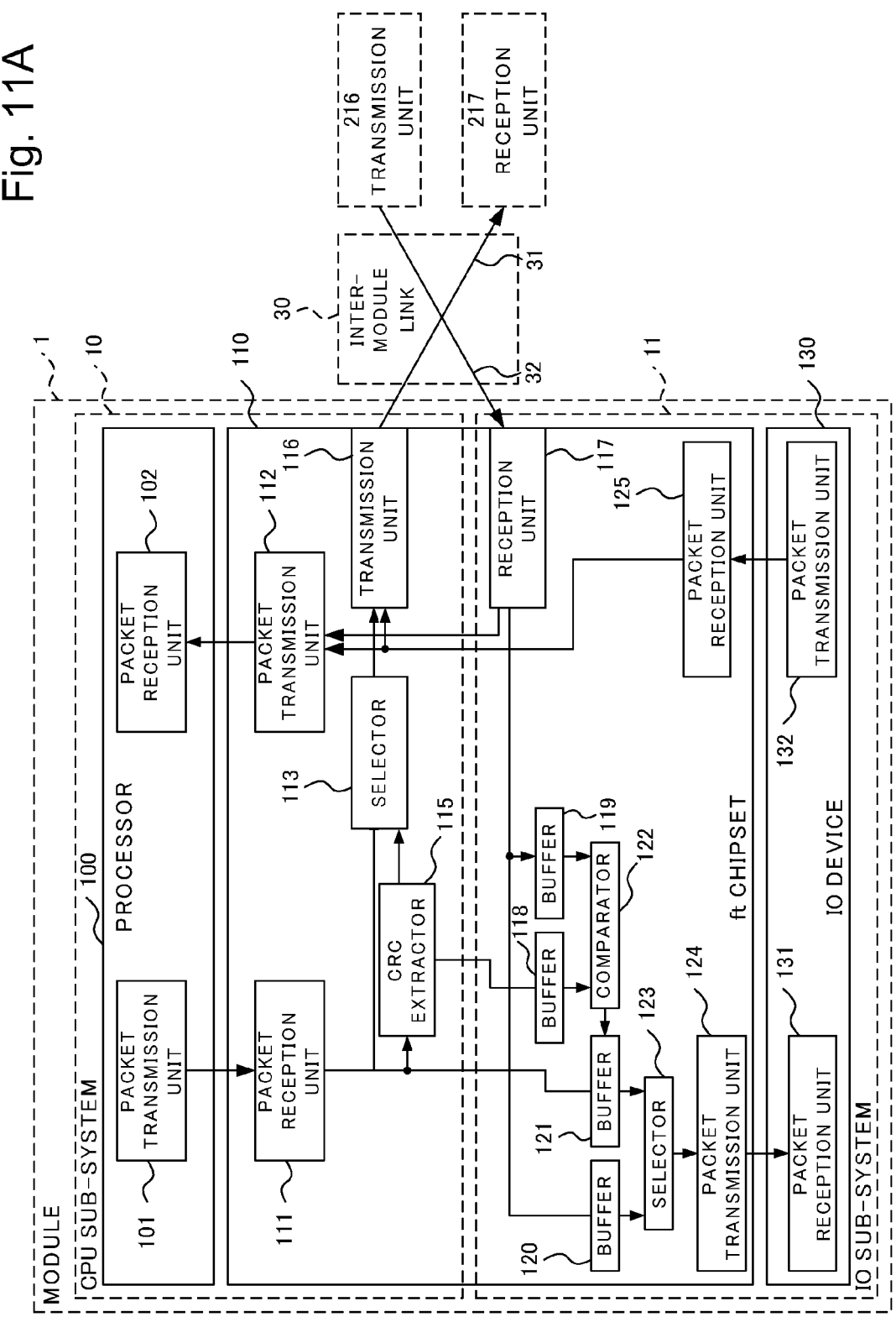
FIG. 11A is a first block diagram illustrating an example of a third exemplary embodiment of the invention.
Figure 11B:
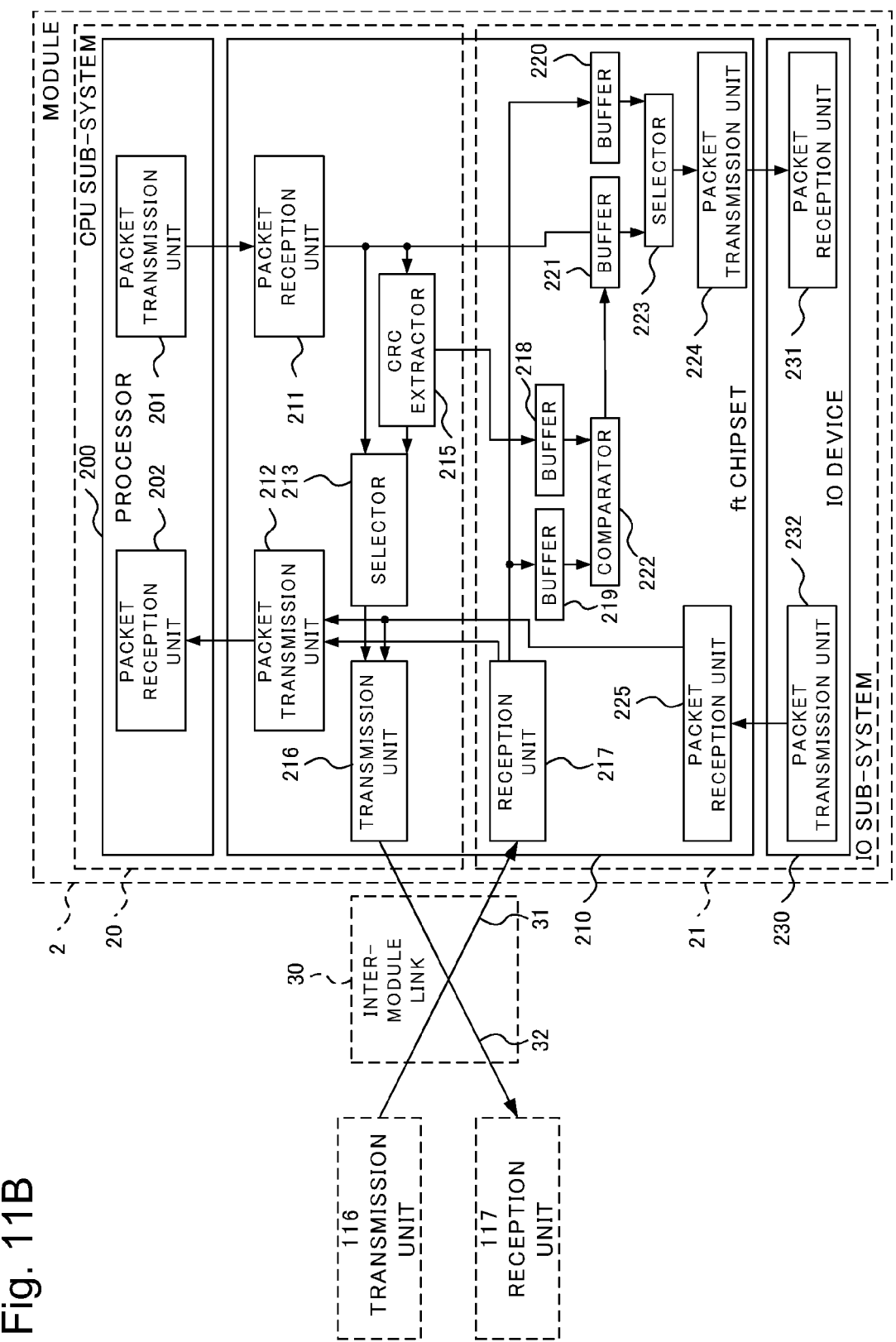
FIG. 11B is a second block diagram illustrating the example of the third exemplary embodiment of the invention.

In FIG. 11A and FIG. 11B show a fault tolerant system according to the third exemplary embodiment of the invention. With reference FIG. 11A and FIG. 11B, a fault tolerant system achieved by using a module 1 and a module 2 is shown. In FIG. 11A, the module 1 is shown. In FIG. 11B, the module 2 is shown. The module 1 and the module 2 are connected with each other by an inter-module link 30. The inter-module link 30 is includes two signal transmission path, i.e. a signal transmission path 31 which is used for transmission from the module 1 to the module 2 and a signal transmission path 32 which is used for transmission from the module 2 to the module 1.

The module 1 and the module 2 relate to the sub-system 11000 and the sub-system 12000 in the first exemplary embodiment, respectively. The inter-module link 30 relates to the signal transmission path 13000. The module 1 and the module 2 relate to the subsystem 1100 and the sub-system 1200 in the second exemplary embodiment, respectively. The signal transmission path 31 and the signal transmission path 32 correspond to the signal transmission path 1300 and the signal transmission path 1400, respectively.

The module 1 includes a processor 100, a ft chipset 110, and an IO device 130. The processor 100 includes a packet transmission unit 101 and a packet reception unit 102, in addition to a CPU, memory, and the like, which are not illustrated. The IO device 130 includes a packet transmission unit 131 and a packet reception unit 132, in addition to an IO device, and the like, which are not illustrated. The ft chipset 110 includes a packet reception unit 111, a packet transmission unit 112, a selector 113, a CRC extractor 115, a transmission unit 116, a reception unit 117, a buffer 118, a buffer 119, a buffer 120, a buffer 121, a comparator 122, a selector 123, a packet transmission unit 124, and a packet reception unit 125. The ft chipset 110 is connected with the inter-module link 30.

The processor 100 relates to the processor unit 11100 in the first exemplary embodiment. The ft chipset 110 relates to the control unit 11300 in the first exemplary embodiment. The IO device 130 relates to the input-output unit 11200 in the first exemplary embodiment. The processor 100 relates to the processor unit 1110 in the second exemplary embodiment. The ft chipset 110 relates to the control unit 1130 in the second exemplary embodiment. The IO device 130 relates to the input-output unit 1120 in the second exemplary embodiment.

A configuration of the module 2 is similar to that of the module 1. The module 2 includes a processor 200, a ft chipset 210, and an IO device 230. The processor 200 includes a packet transmission unit 201 and packet reception unit 202, in addition to a CPU, memory, and the like, which are not illustrated. The IO device 230 includes a packet transmission unit 231 and a packet reception unit 232, in addition to an IO device, and the like, which are not illustrated. The ft chipset 210 includes a packet reception unit 211, a packet transmission unit 212, a selector 213, a CRC extractor 215, a transmission unit 216, a reception unit 217, a buffer 218, a buffer 219, a buffer 220, a buffer 221, a comparator 222, a selector 223, packet transmission unit 224, and a packet reception unit 225. The ft chipset 210 is connected with the inter-module link 30.

The processor 200 relates to the processor unit 12100 in the first exemplary embodiment. The ft chipset 210 relates to the control unit 12300 in the first exemplary embodiment. The IO device 230 relates to the input-output unit 12200 in the first exemplary embodiment. The processor 200 relates to the processor unit 1210 in the second exemplary embodiment. The ft chipset 210 relates to the control unit 1230 in the second exemplary embodiment. The IO device 230 relates to the input-output unit 1220 in the second exemplary embodiment.

The module 1 and the module 2 have an identical configuration. Therefore, the module 1 is explained below.

The processor 100 generates a packet to the IO device 130 and the IO device 230. The packet includes e.g. information on a destination, information on transmission source, data, CRC, and other information. The packet generated by the processor 100 is transmitted by the packet transmission unit 101 to the ft chipset 110 relaying the packet. The packet reception unit 102 receives the packet from the ft chipset 110.

The IO device 130 generates a packet to the processor 100 and the processor 200. The generated packet is transmitted by the packet reception unit 132 to the ft chipset 110 relaying the packet. The packet reception unit 131 receives the packet from the ft chipset 110.

The ft chipset 110 relays packets issued from the processor 100, the processor 200, the IO device 130, and the IO device 230.

The packet reception unit 111 outputs the packet received from the processor 100. The packet reception unit 111 confirms a destination of the packet received from the processor 100. The packet reception unit 111 registers the received packet in the buffer 121 if the received packet is the packet addressed to the IO device 130.

The packet transmission unit 112 transmits a packet received from the reception unit 117 or from the packet reception unit 125 to the processor 100.

The selector 113 selects an output of the CRC extractor 115 when the CPU sub-system performs lockstep operations. The selector 113 selects an output from the packet reception unit 111 when the CPU sub-system does not perform lockstep operations.

The CRC extractor 115 extracts CRC from the packet outputted from the packet reception unit 111. The CRC extractor 115 outputs the extracted CRC to the selector 113. The CRC extractor 115 registers the extracted CRC in the buffer 118.

The transmission unit 116 transmits CRC or a packet outputted from the selector 113, to the IO sub-system 21 of the module 2, through the signal transmission path 31 of the inter-module link 30. The transmission unit 116 also transmits a packet received from the packet reception unit 125, to the IO sub-system 21 of the module 2, through the signal transmission path 31.

The reception unit 117 registers CRC, which is received from the CPU sub-system 20 of the module 2 through the signal transmission path 32 of the inter-module link 30, in the buffer 119. The reception unit 117 registers a packet, which is received from the CPU sub-system 20 of the module 2 through the signal transmission path 32, in the buffer 120.

The comparator 122 compares CRC outputted from the buffer 118 with CRC outputted from the buffer 119. The comparator 122 instructs the buffer 121 to output a packet, when the CRCs coincide with each other.

The selector 123 selects the buffer 121, when the CPU sub-system performs lockstep operations or when only the CPU sub-system 10 operates. The selector 123 selects the buffer 120 when only the CPU sub-system 20 operates.

<Operations of the Third Exemplary Embodiment>

Operations which are carried out when the CPU sub-system 10 and the CPU sub-system 20 perform lockstep operations are different from operations which are carried out when the CPU sub-system 10 and the CPU sub-system 20 do not perform lockstep operations. First, the operations which are carried out when the CPU sub-system 10 and the CPU sub-system 20 perform lockstep operations are explained.

When the CPU sub-system performs lockstep operations, the processor 100 and the processor 200 generate the same packet at the same time. Suppose that a destination of the generated packet is the IO device 130. The generated packet is received by the packet reception unit 111 and the packet reception unit 211 through the packet transmission unit 101 and the packet transmission unit 201, respectively. The packet reception unit 111 outputs the received packet. The packet reception unit 111 registers the received packet in the buffer 121. The CRC extractor 115 extracts CRC of the received packet and registers the extracted CRC in the buffer 118.

When a destination of the packet is the IO device 130, the packet reception unit 211 does not register the packet in the buffer 221. The packet received by the packet reception unit 211 and CRC which the CRC extractor 215 extracts from the packet are inputted to the selector 213. Since the CPU sub-systems 10 and 20 perform lockstep operations, the packet reception unit 211 transmits the CRC to the transmission unit 216. The transmission unit 216 transmits the CRC to the reception unit 117 through the signal transmission path 32. The reception unit 117 registers the received CRC in the buffer 119. The comparator 122 compares the CRC registered in the buffer 118 with the CRC registered in the buffer 119. If the CRCs coincide with each other, the comparator 122 instructs the buffer 121 to output the packet registered in the buffer 121. The selector 123 output the packet received from the buffer 121 to the packet transmission unit 124. The packet transmission unit 124 transmits the received packet to the IO device 130.

Next, operations which are carried out when the IO device 130 generates a packet are explained. When the CPU sub-systems 10 and 20 perform lockstep operations, the packet is required to be transmitted to both the processor 100 and the processor 200. The packet transmission unit 132 transmits the packet generated by the IO device 130 to the packet reception unit 125. The packet reception unit 125 outputs the received packet to the packet transmission unit 112 and the transmission unit 116. The packet transmission unit 112 transmits the received packet to the packet transmission unit 102. The transmission unit 116 transmits the received packet to the reception unit 217 through the signal transmission path 31. The reception unit 217 confirms a destination of the received packet. The reception unit 217 outputs the received packet to the packet transmission unit 212. The packet transmission unit 212 transmits the received packet to the packet transmission unit 202.

When the CPU sub-system 10 and the CPU sub-system 20 perform lockstep operations, only CRC is transmitted on the inter-module link 30 with respect to a packet from any of the processors 100 and 200 to any of the IO devices 130 and 230. With respect to a packet from any of the IO devices 130 and 230 to any of the processors 100 and 200, the entirety of the packet is transmitted through the inter-module link 30.

Next, the operations which are carried out when the CPU sub-system 10 and the CPU sub-system 20 do not perform lockstep operations are explained. A case in which the CPU sub-system 10 operates and the CPU sub-system 20 does not operate is explained in the following.

Since only the CPU sub-system 10 operates, a packet addressed to the IO device 130 and a packet addressed to IO device 230 are issued by only the CPU sub-system 10. A case in which the CPU sub-system 10 issues a packet addressed to the IO device 130 is explained. The packet addressed to the IO device 130 issued by the processor 100 of the CPU sub-system 10 is inputted to the buffer 121 through the packet transmission unit 101 and the packet reception unit 111. The CPU sub-system 10 and the CPU sub-system 20 do not perform lockstep operations. Therefore the packet inputted to the buffer 121 is transmitted through the selector 123 and the packet transmission unit 124, and is received by the packet reception unit 131.

Next, a case in which the CPU sub-system 10 issues a packet addressed to the IO device 230 is explained. A packet issued by the processor 100 of the CPU sub-system 10 is transmitted through the packet transmission unit 101 and the packet reception unit 111. Since a destination of the issued packet is the IO device 230, the issued packet is not registered in the buffer 121. A packet addressed to the IO device 230 is transmitted through the selector 113 and the transmission unit 116, and is received by the reception unit 217 through the signal transmission path 31. The reception unit 217 confirms the destination of the received packet. Since the destination of the received packet is the IO device 230, the reception unit 217 registers the received packet in the buffer 220. The registered packet is transmitted through the selector 223 and the packet transmission unit 224, and is received by the packet reception unit 231. As described above, when the CPU sub-system 10 and the CPU sub-system 20 do not perform lockstep operations, with respect to a packet whose destination is the IO device of the module other than the module including the processor that issues the packet, the entirety of the packet is transmitted through the inter-module link 30.

Next, operations which are carried out when the IO device 130 generates a packet are explained. Since only the CPU sub-system 10 works, the packet is transmitted to only the processor 100. The packet generated by the IO device 130 is transmitted through the packet transmission unit 132, the packet reception unit 125, and the packet transmission unit 112, and is received by the packet transmission unit 102.

Next, operations which are carried out when the IO device 230 generates a packet are explained. Since only the CPU sub-system 10 works, the packet is also transmitted to only the processor 100. The packet generated by the IO device 230 is transmitted through the packet transmission unit 232, the packet reception unit 225, and the transmission unit 216, the signal transmission path 32, the reception unit 117, and the packet transmission unit 112, and is received by the packet transmission unit 102. As described above, when the CPU sub-system 10 and the CPU sub-system 20 do not perform lockstep operations and a destination of the packet generated by the IO device is the processor in the module other than the module including the IO device that generates the packet, the entirety of the packet is transmitted through the inter-module link 30.

<Effect of the Third Exemplary Embodiment>

As an effect of the exemplary embodiment, the width of the band required for the inter-module link can be significantly decreased. The reason thereof is described below.

In the second fault tolerant system related to the invention, regardless of whether the CPU sub-systems perform lockstep operations, the entirety of the packet is transmitted through the inter-module link. Therefore, the inter-module link from the CPU sub-system in one (i.e. a module A) of the modules to the IO sub-system in other (i.e. a module B) of the modules, and the inter-module link from the IO sub-system in the module A to the CPU sub-system in the module B have to be separately provided. In contrast, in the system in the exemplary embodiment, when the CPU sub-systems perform lockstep operations, only CRC has to be transmitted from the CPU sub-system in one module to the IO sub-system in another module. Amounts of data including only CRC can be suppressed to a fraction of several dozen, compared with amounts of data included in the entirety of the packet. Therefore amounts of data transmission from the CPU sub-system in one module to the IO sub-system in another module can be significantly decreased. When the CPU sub-systems do not perform lockstep operations, the entirety of the packet has to be transmitted from the working CPU sub-system to the IO sub-system in the module other than the module including the working CPU sub-system. However data is unnecessary to be transmitted from the CPU sub-system which does not work to the IO sub-system in the module other than the module including the CPU sub-system which does not work. Amounts of data which is transferred from the module 1 to the module 2 and from the module 2 to the module 1 on the inter-module link is small by amounts of data for CRC transmission, compared with the case in which the CPU sub-systems perform lockstep operations.

As described above, in the second fault tolerant system related to the invention, assuming that the width of the band required for transmission of the entirety of the packet is P, transmission from the module 1 to the module 2 requires a band having a width of 2P, and transmission from the module 2 to the module 1 requires a band having a width of 2P. Assuming that the width of a band required for transmission of only CRC is C that is much smaller than P, the transmission from the module 1 to the module 2 requires only the band having a width of P+C, and the transmission from the module 2 to the module 1 requires only the band having a width of P+C. Thereby the width of the band required for the transmission from the module 1 to the module 2 and the band required for the transmission from the module 2 to the module 1 are decreased by P-C. As described above, since C is much smaller than P, the band for data can be decreased much.

<Fourth Exemplary Embodiment>

Figure 12A:
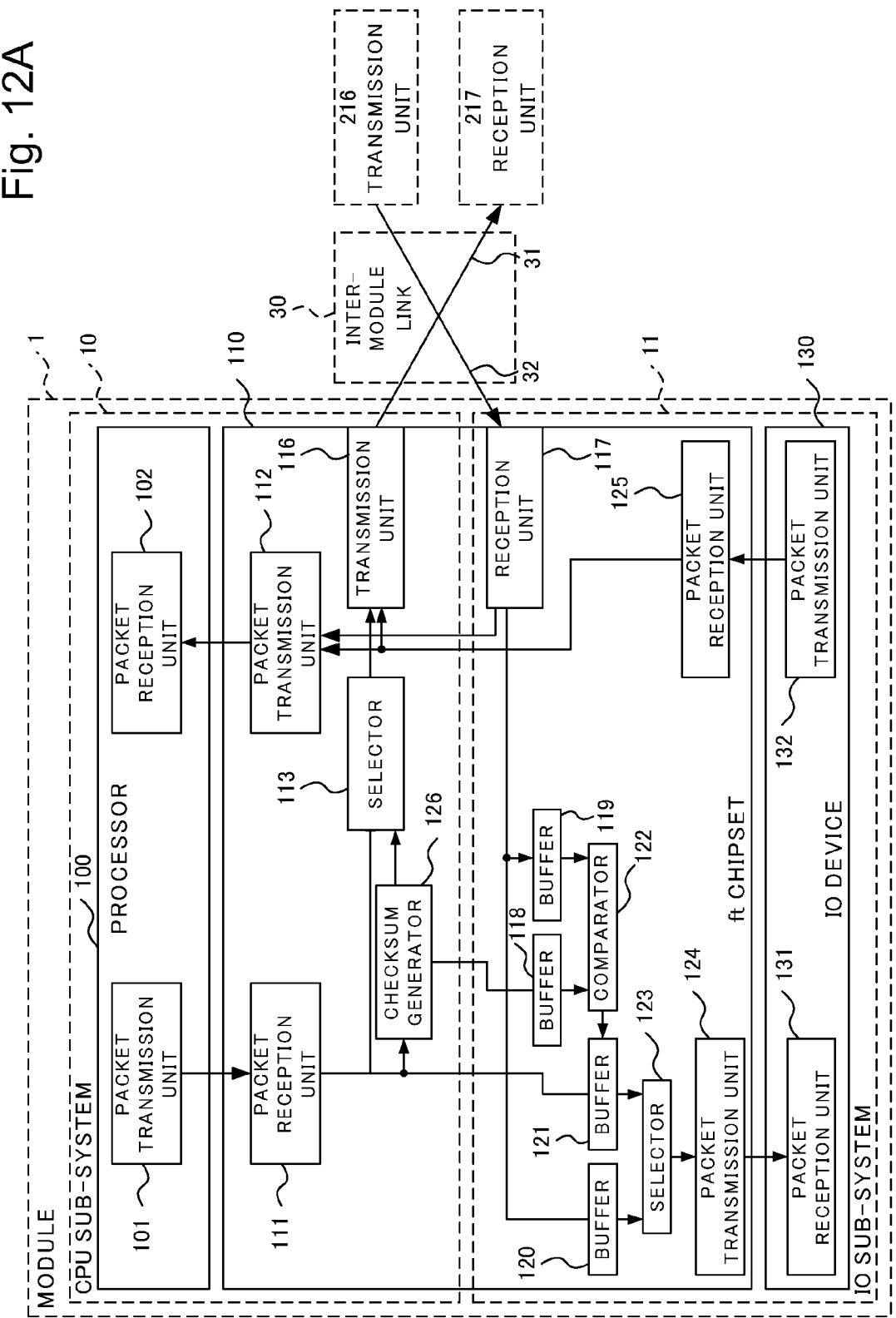
FIG. 12A is a first block diagram illustrating an example of a fourth exemplary embodiment of the invention.
Figure 12B:
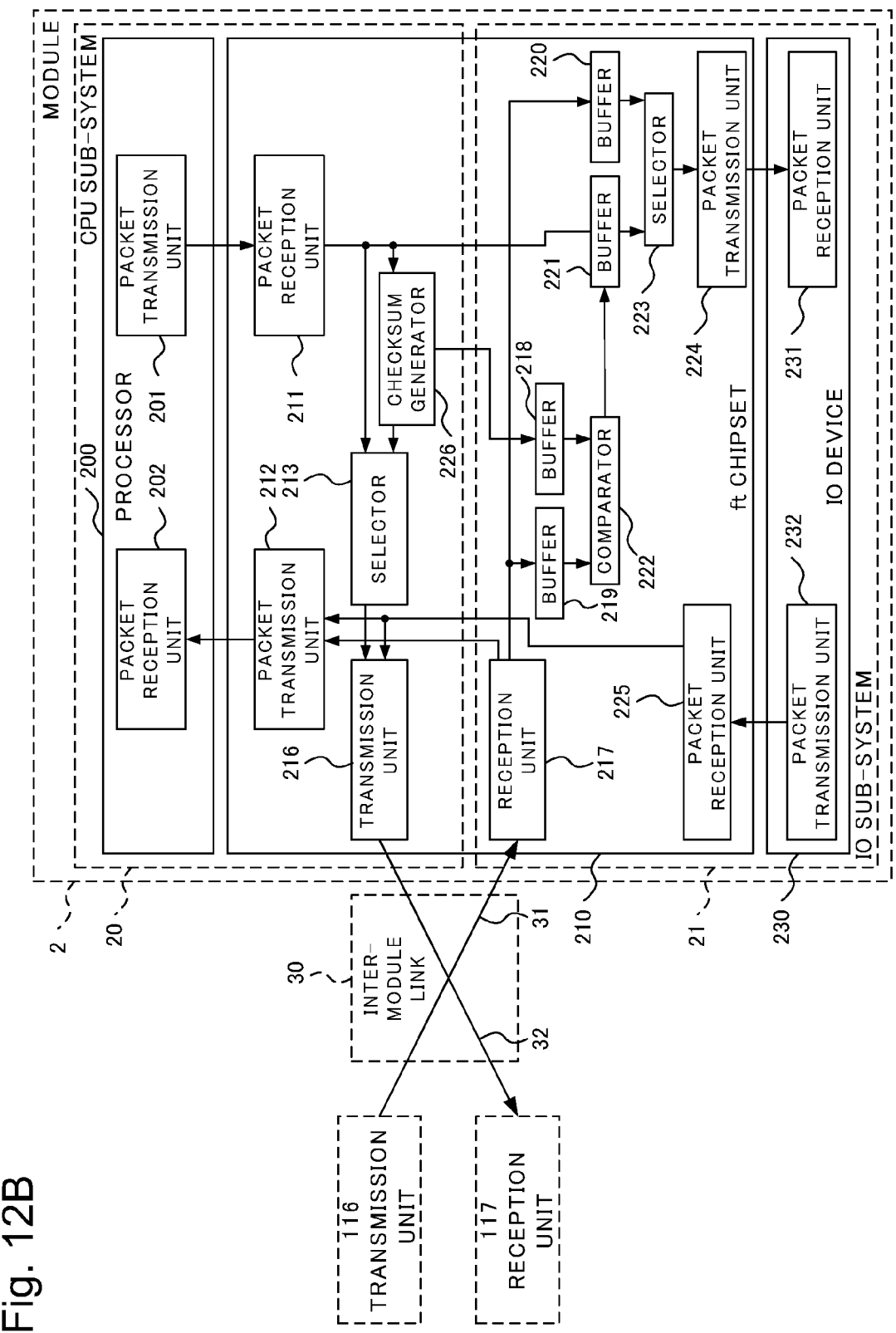
FIG. 12B is a second block diagram illustrating the example of the fourth exemplary embodiment of the invention.

FIG. 12A and FIG. 12B illustrate an example of a structure of a fault tolerant system according to a fourth exemplary embodiment of the present invention. The fault tolerant system according to a fourth exemplary embodiment includes a module 1 and a module 2. FIG. 12A illustrates an example of a structure of the module 1 of the fault tolerant system according to the present exemplary embodiment. FIG. 12B illustrates an example of a structure of the module 2 of the fault tolerant system according to the present exemplary embodiment. The fault tolerant system according to the present exemplary embodiment has the same structure as that of the fault tolerant system according to the third exemplary embodiment except the following difference. In the fourth exemplary embodiment of the present invention, the CRC extractor 115 and the CRC extractor 215 of the third exemplary embodiment are replaced with a checksum generator 126 and a checksum generator 226, respectively. Since the checksum generator 126 is similar to the checksum generator 226, as an example, the checksum generator 126 is explained below.

The checksum generator 126 generates checksum information on the basis of a packet received from the packet reception unit 111 and information of time when the packet is received. When CPU sub-systems perform lockstep operations, the checksum information is transmitted by the CPU sub-system included in one module to an IO sub-system of the module other than the module including the CPU sub-system which transmits the checksum information.

Checksum transmission instead of CRC transmission has the advantage in which the information about time is added to the checksum.

When a correctable error occurs, for example, in the processor 100, identical packets are often transmitted from the processor 100 and the processor 200 at different times. The time when a packet is transmitted from the processor 100 to the ft chipset 110 is slightly different from the time when a packet is transmitted from the processor 200 to the ft chipset 210 in many cases. However, in a specification of PCI-Express, for example, even though the ft chipset 110 and the ft chipset 210 receive the identical packets from the processor 100 and the processor 200 at different times, respectively, the packets include the identical CRCs. In the third exemplary embodiment, therefore, the comparator 122 cannot detect the difference.

However, the checksums include information about time. When the ft chipset 110 and the ft chipset 210 receive the identical packets from the processor 100 and the processor 200 at different times, respectively, the two checksums generated by the checksum generators 126 and 226 are different from each other. Consequently the comparator 122 can detect the difference. Thereby abnormality of the processor 100 can be promptly detected.

When a link specification, in which a packet which is transferred through a link between the processor and the ft chipset does not include CRC, is adopted, the third exemplary embodiment using the CRC extractor does not work.

<Fifth Exemplary Embodiment>

Figure 18:
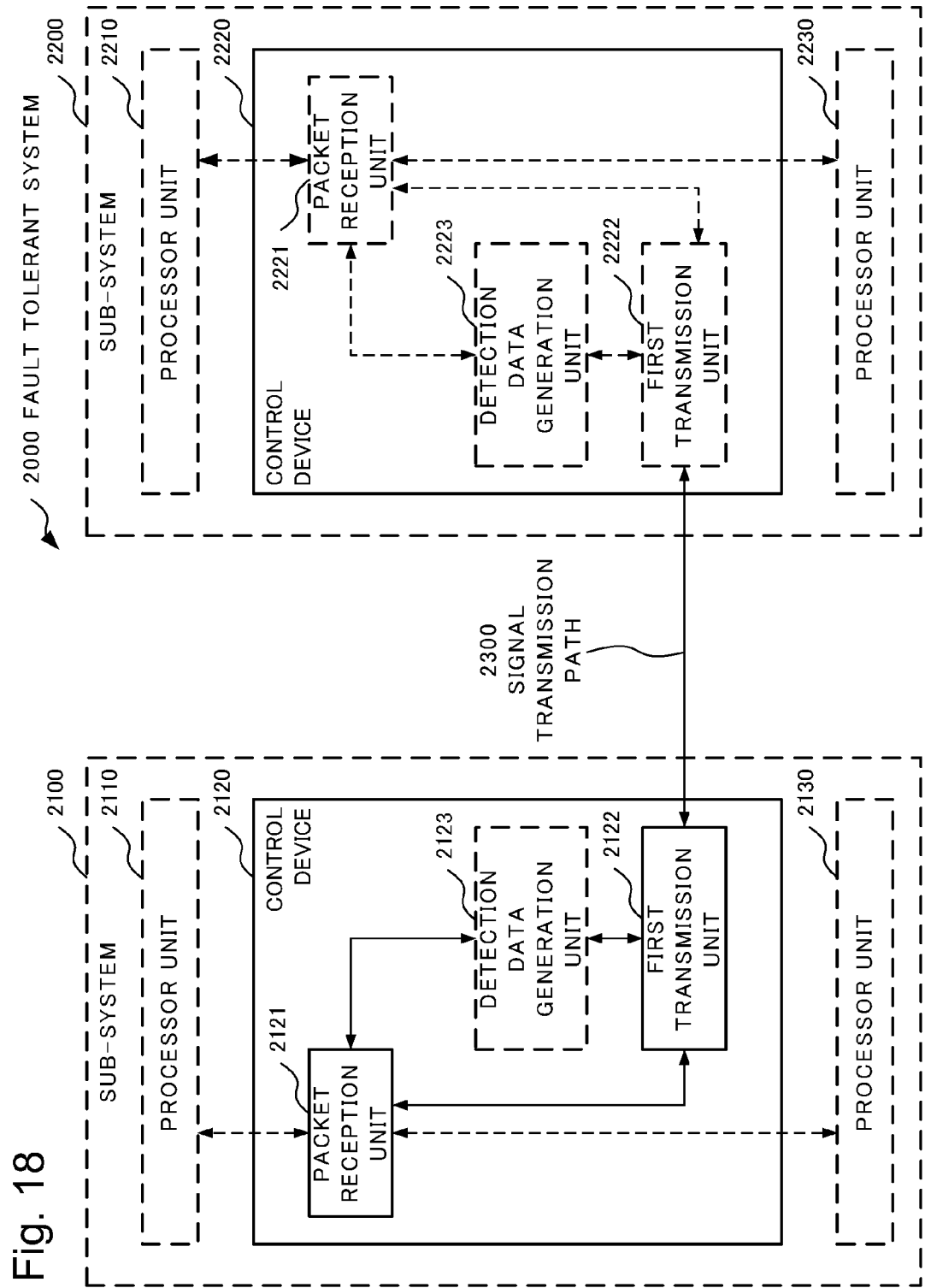
FIG. 18 is a block diagram illustrating an example of a fifth exemplary embodiment of the invention.

FIG. 18 is a block diagram of a control device 2120 in a fifth exemplary embodiment of the present invention. The exemplary embodiment is an exemplary embodiment representing an idea common to each exemplary embodiment.

With reference to FIG. 18, a plurality of sub-systems (e.g. sub-system 2100 and sub-system 2200) is included to a fault tolerant system 2000. The plurality of sub-systems have identical hardware structures. Each of the plurality of sub-systems includes a control device 2120. Specifically the sub-system 2100 includes a control device 2120. The sub-system 2200 includes a control device 2220. The sub-system 2100 and the sub-system 2200 have identical hardware structures. Each of elements of the sub-system 2200 is the same as the element to which the same name is given in the sub-system 2100. Therefore, the sub-system 2100 is explained below, and detailed explanations on the sub-system 2200 are omitted.

The sub-system 2100 includes a processor unit 2110, the control device 2120, an input-output unit 2130, and a signal transmission path 2300. The processor unit 2110 is operable when the plurality of sub-systems are in a lockstep synchronous state and when the plurality of sub-systems are in a lockstep asynchronous state. That is, the processor unit 2110 and the processor unit 2210 are operable in the lockstep synchronous state and in the asynchronous state. The input-output unit 2130 is connected with the processor unit 2110. The signal transmission path 2300 connects the plurality of sub-systems with each other through the control device 2120.

The control device 2120 of the exemplary embodiment is connected between the processor unit 2110 and the input-output unit 2130. The control device 2120 includes a packet reception unit 2121 and a first transmission unit 2122. The packet reception unit 2121 receives data from the processor unit 2110. When the processor unit 2110 is in the lockstep synchronous state, the first transmission unit 2122 transmits, to the sub-system 2200, error detection data generated from the data of accessing from the processor unit 2110 of the sub-system 2100 to the input-output unit 2130. When the processor unit 2110 is in the lockstep asynchronous state, the first transmission unit 2122 transmits, to the sub-system 2200, the data of accessing from the processor unit 2110 of the sub-system 2100 to the input-output unit 2130.

The error detection data is generated, for example, by a detection data generation unit 2123.

The sub-system 2100 corresponds to the above-described module 1 shown in FIG. 11A and FIG. 12A. The sub-system 2200 corresponds to the above-described module 2 shown in FIG. 11B and FIG. 12B. The processor unit 2110 corresponds to the above-described processor 100. The processor unit 2210 corresponds to the above-described processor 200. The control device 2120 corresponds to the above-described ft chipset 110. The control device 2220 corresponds to the above-described ft chipset 210. The input-output unit 2130 corresponds to the above-described IO device 130. An input-output unit 2230 corresponds to the above-described IO device 230. The signal transmission path 2300 corresponds to the above-described inter-module link 30. The packet reception unit 2121 corresponds to the above-described packet reception unit 111. The packet reception unit 2221 corresponds to the above-described packet reception unit 211. The first transmission unit 2122 corresponds to the above-described the transmission unit 116. A first transmission unit 2222 corresponds to the above-described the transmission unit 216. The detection data generation unit 2123 corresponds to the CRC extraction unit 115 or the checksum generator 126. A detection data generation unit 2223 corresponds to the CRC extraction unit 215 or the checksum generator 226.

A part or whole of the above-described exemplary embodiments can be described as following supplemental notes, but is not limited thereto.

(Supplemental Note 1)

A fault tolerant system including a plurality of sub-systems having identical hardware structures, wherein the plurality of sub-systems includes:

a processor unit which is operable in a lockstep synchronous state with respect to the plurality of sub-systems and in a lockstep asynchronous state with respect to the plurality of sub-systems;

an input-output unit which is connected with the processor unit;

a control unit which is connected between the processor unit and the input-output unit; and a signal transmission path which connects the plurality of sub-systems with one another through the control unit, and the control unit transmits, to an companion sub-system, error detection data that is generated from the data of accessing from the processor unit to the input-output unit in an own sub-system when the processor unit is in the lockstep synchronous state, and transmits, to the companion sub-system, the data that is accessed from the processor unit to the input-output unit in the own sub-system when the processor is in the lockstep asynchronous state.

(Supplemental Note 2)

The fault tolerant system according to the supplemental note 1, wherein the signal transmission path includes a plurality of signal transmission paths, and the control unit performs control in which, when the processor is in the lockstep synchronous state, the error detection data that is generated from the data of accessing from the processor unit to input-output unit in the own sub-system is transmitted to the companion sub-system, and the data of accessing from the input-output unit to the processor unit in the own sub-system is transmitted to the companion sub-system, by sharing one signal transmission path of the signal transmission paths, and, when the processor is in the lockstep asynchronous state, the one signal transmission path is used for either transmission of the data of accessing from the processor unit to the input-output unit in the own sub-system to the companion sub-system or transmission of the data of accessing from the input-out unit to the processor unit in the own sub-system to the companion sub-system.

(Supplemental Note 3)

The fault tolerant system according to the supplemental note 2, wherein the control unit includes: an error detection data generator which generates checksum from a reception time of the data of accessing from the processor unit to the input-output unit in the own sub-system and the data, and outputs the generated checksum as the error detection data.

(Supplemental Note 4)

The fault tolerant system according to the supplemental note 2, wherein the control unit includes error detection: data generator which extracts CRC included in the data of accessing from the processor unit to the input-output unit in the own sub-system, and outputs the extracted CRC as the error detection data.

(Supplemental Note 5)

The fault tolerant system according to the supplemental note 3 or 4, wherein the control unit includes: a first selector which selects either the data of accessing from the processor unit to the input-output unit in the own sub-system or the error detection data outputted from the error detection data generator.

(Supplemental Note 6)

The fault tolerant system according to the supplemental note 5, wherein the control unit includes:

a first transmission unit which transmits an output of the first selector in the control unit and data of accessing from the input-output unit in the own sub-system to the processor unit in the companion sub-system through the one signal transmission path;

a first buffer which temporarily stores the error detection data outputted from the error detection data generator of the control unit;

a second buffer which temporarily stores the error detection data received through the one signal transmission path;

a third buffer which temporarily stores the data of accessing from the processor unit to the input-output unit in the own sub-system;

a fourth buffer which temporarily stores the data of accessing from the processor unit in the companion sub-system to the input-output unit in the own sub-system, the data being received through the one signal transmission path;

a comparator which compares the error detection data stored in the first buffer with the error detection data stored in the second buffer; and a second selector which outputs, when the processor is in the lockstep synchronous state, the data stored in the third buffer to the input-output unit in one sub-system if the comparator detects coincidence, and outputs, when the processor is in the lockstep asynchronous state, the data stored in the third buffer or the data stored in the fourth buffer to the input-output unit in the own sub-system.

(Supplemental Note 7)

A control device being used in a fault tolerant system, wherein the control device is used in each of a plurality of sub-systems included in the fault tolerant system including the plurality of sub-systems each having identical hardware structures, the control device is connected between a processor unit being operable in a lockstep synchronous state of an own sub-system and an companion sub-system and in a lockstep asynchronous state of the own sub-system and the companion sub-system and an input-output unit being connected with the processor unit, and is connected with a signal transmission path connecting between the own sub-system and the companion sub-system, and the control device transmits error detection data which is generated from the data of accessing from the processor unit to the input-output unit in the own sub-system to another sub-system when the processor unit is in the lockstep synchronous state, and transmits the data of accessing from the processor unit to the input-output unit in the own sub-system to the companion sub-system when the processor is in the lockstep asynchronous state.

(Supplemental Note 8)

The control device according to the supplemental note 7, being used in a fault tolerant system, wherein the signal transmission path includes a plurality of signal transmission paths, and the control device performs control in which, when the processor is in the lockstep synchronous state, the error detection data that is generated from the data of accessing from the processor unit to input-output unit in the own sub-system is transmitted to the companion sub-system, and the data of accessing from the input-output unit to the processor unit in the own sub-system is transmitted to the companion sub-system, by sharing one signal transmission path in the plurality of signal transmission paths, and, when the processor is in the lockstep asynchronous state, the one signal transmission path is used for either transmission of the data of accessing from the processor unit to the input-output unit in the own sub-system to the companion sub-system or transmission of the data of accessing from the input-out unit to the processor unit in the own sub-system to the companion sub-system.

(Supplemental Note 9)

The control device according to the supplemental note 8, being used in a fault tolerant system, including:

an error detection data generator which generates checksum from a reception time of the data of accessing from the processor unit to the input-output unit in the own sub-system and the data, and outputs the generated checksum as the error detection data.

(Supplemental Note 10)

The control device according to the supplemental note 8, being used in a fault tolerant system, including:

an error detection data generator which extracts CRC included in the data of accessing from the processor unit to the input-output unit in one sub-system, and outputs the extracted CRC as the error detection data.

(Supplemental Note 11)

The control device according to the supplemental note 9 or 10, being used in a fault tolerant system, including:

a first selector which selects either the data of accessing from the processor unit to the input-output unit in the own sub-system or the error detection data outputted from the error detection data generator.

(Supplemental Note 12)

The control device according to the supplemental note 11, being used in a fault tolerant system, including:

the first transmission unit which transmits an output of the first selector and data of accessing from the input-output unit in the own sub-system to the processor unit in the companion sub-system through the one signal transmission path;

a first buffer which temporarily stores the error detection data outputted from the error detection data generator;

a second buffer which temporarily stores the error detection data received through the one signal transmission path;

a third buffer which temporarily stores the data of accessing from the processor unit to the input-output unit in the own sub-system;

a fourth buffer which temporarily stores the data of accessing from the processor unit in the companion sub-system to the input-output unit in the own sub-system, the data being received through the one signal transmission path;

a comparator which compares the error detection data stored in the first buffer with the error detection data stored in the second buffer; and a second selector which outputs, when the processor is in the lockstep synchronous state, the data stored in the third buffer to the input-output unit in the own sub-system if the comparator detects coincidence, and outputs, when the processor is in the lockstep asynchronous state, the data stored in the third buffer or the data stored in the fourth buffer to the input-output unit in the own sub-system.

(Supplemental Note 13)

A operating method of a fault tolerant system, the fault tolerant system includes a plurality of sub-systems each having identical hardware structures, the plurality of sub-systems each including: a processor unit being operable in a lockstep synchronous state of the plurality of sub-systems and in a lockstep asynchronous state of the plurality of sub-systems; an input-output unit being connected with the processor unit; a control unit being connected between the processor unit and the input-output unit; and a signal transmission path connecting the plurality of sub-systems with one another through the control unit, wherein the control unit transmits, when the processor unit is in the lockstep synchronous state, error detection data generated from the data of accessing from the processor unit to the input-output unit in an own sub-system to an companion sub-system, and transmits, when the processor unit is in the lockstep asynchronous state, the data of accessing from the processor unit to the input-output unit in the own sub-system to the companion sub-system.

(Supplemental Note 14)

The operating method according to the supplemental note 13, the operating method operating a fault tolerant system, wherein the signal transmission path includes a plurality of signal transmission paths, and the control unit performs control in which, when the processor is in the lockstep synchronous state, the error detection data that is generated from the data of accessing from the processor unit to input-output unit in the own sub-system is transmitted to the companion sub-system, and the data of accessing from the input-output unit to the processor unit in the own sub-system is transmitted to the companion sub-system, by sharing one signal transmission path in the plurality of signal transmission paths, and, when the processor is in the lockstep asynchronous state, the one signal transmission path is used for either transmission of the data of accessing from the processor unit to the input-output unit in the own sub-system to the companion sub-system or transmission of the data of accessing from the input-out unit to the processor unit in the own sub-system to the companion sub-system.

(Supplemental Note 15)

The operating method according to the supplemental note 14, the operating method operating a fault tolerant system, wherein the control device generates checksum from a reception time of the data of accessing from the processor unit to the input-output unit in the own sub-system and the data, and uses the generated checksum as the error detection data.

(Supplemental Note 16)

The operating method according to the supplemental note 14, the operating method operating a fault tolerant system, wherein the control device extracts CRC included in the data of accessing from the processor unit to the input-output unit in the own sub-system, and uses the extracted CRC as the error detection data.

(Supplemental Note 17)

A operating method of operating a control device used in a fault tolerant system, the control device being used in each of a plurality of sub-systems of the fault tolerant system including the plurality of sub-systems each having identical hardware structures, the control device being connected with a processor unit being operable in a lockstep synchronous state of the plurality of sub-systems and in a lockstep asynchronous state of the plurality of sub-systems and an input-output unit being connected with the processor unit, the control device being connected with a signal transmission path connecting the plurality of sub-systems one another, wherein the control device transmits, when the processor unit is in the lockstep synchronous state, error detection data generated from the data of accessing from the processor unit to the input-output unit in an own sub-system to an companion sub-system, and transmits, when the processor unit is in the lockstep asynchronous state, the data of accessing from the processor unit to the input-output unit in the own sub-system to the companion sub-system.

(Supplemental Note 18)

The operating method according to the supplemental note 17, the operating method operating a control device used in a fault tolerant system, wherein the signal transmission path includes a plurality of signal transmission paths, and the control device performs control in which, when the processor is in the lockstep synchronous state, the error detection data that is generated from the data of accessing from the processor unit to input-output unit in the own sub-system is transmitted to the companion sub-system, and the data of accessing from the input-output unit to the processor unit in the own sub-system is transmitted to the companion sub-system, by sharing one signal transmission path, and, when the processor is in the lockstep asynchronous state, the one signal transmission path is used for either transmission of the data of accessing from the processor unit to the input-output unit in the own sub-system to the companion sub-system or transmission of the data of accessing from the input-out unit to the processor unit in the own sub-system to the companion sub-system.

(Supplemental Note 19)

A non-transitory computer-readable medium storing a program causing a computer of a control device being used in each of a plurality of sub-systems of a fault tolerant system including the plurality of sub-systems each having identical hardware structures, the control device being connected between a processor unit operable in a lockstep synchronous state of an own sub-system and an companion sub-system and in a lockstep asynchronous state of an own sub-system and an companion sub-system and an input-output unit being connected with the processor unit, the control device being further connected with a signal transmission path connecting between the own sub-system and the companion sub-system, to execute:

transmitting, to the companion sub-system, error detection data that is generated from the data of accessing from the processor unit to the input-output unit in the own sub-system when the processor is in the lockstep synchronous state; and transmitting, to the companion sub-system, the data of accessing from the processor unit to the input-output unit in the own sub-system when the processor is in the lockstep asynchronous state.

(Supplemental Note 20)

The non-transitory computer-readable medium according to the supplemental note 19, wherein the signal transmission path includes a plurality of signal transmission paths, and the program causes the computer to execute:

performing control in which, when the processor is in the lockstep synchronous state, the error detection data that is generated from the data of accessing from the processor unit to input-output unit in the own sub-system is transmitted to the companion sub-system, and the data of accessing from the input-output unit to the processor unit in the own sub-system is transmitted to the companion sub-system, by sharing one signal transmission path in the plurality of signal transmission paths; and performing control in which, when the processor is in the lockstep asynchronous state, the one signal transmission path is used for either transmission of the data of accessing from the processor unit to the input-output unit in the own sub-system to the companion sub-system or transmission of the data of accessing from the input-out unit to the processor unit in the own sub-system to the companion sub-system.

Though the present invention is explained by describing several exemplary embodiments, the present invention is not limited to the above-described embodiments. It is to be understood that to the configurations and details of the present invention, various changes can be made within the scope of the present invention as defined by the claims.

Industrial Applicability

The invention can be applied to a fault tolerant system, e.g. the fault tolerant system achieved by hardware.

What is claimed is:

1. A control device included in a sub-system of a plurality of sub-systems included in a fault tolerant system, the control device comprising:

a packet reception unit that receives data from a processor unit included in the plurality of sub-systems, each of the sub-systems including: a processor unit operable in a lockstep synchronous state of the plurality of sub-systems and in a lockstep asynchronous state of the plurality of sub-systems, an input-output unit connected with the processor unit, and a signal transmission path connecting the plurality of sub-systems to one another through the control device, the signal transmission path including a plurality of signal transmission paths, the control device being connected between the processor unit and the input-output unit; and a transmission unit that transmits (i) error detection data, generated from first access data of accessing from the processor unit to the input-output unit in one of the sub-systems including the control device, to a companion sub-system of the plurality of sub-systems, the companion sub-system being different from the one sub-system, when the processor unit is in the lockstep synchronous state, and (ii) the first access data of accessing from the processor unit to the input-output unit in the one sub-system, to the companion sub-system, when the processor unit is in the lockstep asynchronous state, the one sub-system and the companion sub-system being in the plurality of sub-systems, wherein the transmission unit performs control in which, when the processor unit is in the lockstep synchronous state, the error detection data that is generated from the first access data is transmitted to the companion sub-system, and second access data of accessing from the input-output unit to the processor unit in the one sub-system, is transmitted to the companion sub-system by sharing one signal transmission path, and the transmission unit controls so that, when the processor unit is in the lockstep asynchronous state, the one signal transmission path is used for either (i) transmission of the first access data of accessing from the processor unit to the input-output unit in the one sub-system, to the companion sub-system, or (ii) transmission of the second access data of accessing from the input-output unit to the processor unit in the one sub-system, to the companion sub-system.

2. The control device according to claim 1, further comprising:

an error detection data generator that generates a checksum from a reception time of the first access data of accessing from the processor unit to the input-output unit in the one sub-system, and the first access data, and outputs the generated checksum as the error detection data.

3. The control device according to claim 1, further comprising:

an error detection data generator that extracts Cyclic Redundancy Check (CRC) included in the first access data of accessing from the processor unit to the input-output unit in the one sub-system, and outputs the extracted CRC as the error detection data.

4. The control device according to claim 2, further comprising:

a first selector that selects either (i) the first access data of accessing from the processor unit to the input-output unit in the one sub-system, or (ii) the error detection data output from the error detection data generator.

5. The control device according to claim 4, wherein the transmission unit transmits to the one signal transmission path:

an output of the first selector in a control unit, and the second access data of accessing from the input-output unit in the one sub-system to the processor unit in the companion sub-system, and the control device further comprises:

a first buffer that temporarily stores the error detection data output from the error detection data generator of the control unit;

a second buffer that temporarily stores the error detection data received through the signal transmission path;

a third buffer that temporarily stores the first access data of accessing from the processor unit to the input-output unit in the one sub-system;

a fourth buffer that temporarily stores third access data of accessing from the processor unit in the companion sub-system to the input-output unit in the one sub-system, the third access data being received through the signal transmission path;

a comparator that compares the error detection data stored in the first buffer with the error detection data stored in the second buffer; and a second selector that outputs, when the processor unit is in the lockstep synchronous state, the first access data stored in the third buffer to the input-output unit in the one sub-system when the comparator detects coincidence, and that outputs, when the processor unit is in the lockstep asynchronous state, the first access data stored in the third buffer or the third access data stored in the fourth buffer to the input-output unit in the one sub-system.

6. The control device according to claim 3, further comprising:

a first selector that selects either (i) the first access data for accessing, from the processor unit, to the input-output unit in the one sub-system or (ii) the error detection data output from the error detection data generator.

7. The control device according to claim 6, wherein the transmission unit transmits to the one signal transmission path:

an output of the first selector in a control unit, and the second access data of accessing from the input-output unit in the one sub-system to the processor unit in the companion sub-system, and the control device further comprises:

a first buffer that temporarily stores the error detection data output from the error detection data generator of the control unit;

a second buffer that temporarily stores the error detection data received through the signal transmission path;

a third buffer that temporarily stores the first access data of accessing from the processor unit to the input-output unit in the one sub-system;

a fourth buffer that temporarily stores third access data of accessing from the processor unit in the companion sub-system to the input-output unit in the one sub-system, the third access data being received through the signal transmission path;

a comparator that compares the error detection data stored in the first buffer with the error detection data stored in the second buffer; and a second selector that outputs, when the processor unit is in the lockstep synchronous state, the first access data stored in the third buffer to the input-output unit in the one sub-system when the comparator detects coincidence, and that outputs, when the processor unit is in the lockstep asynchronous state, the first access data stored in the third buffer or the third access data stored in the fourth buffer to the input-output unit in the one sub-system.

8. A fault tolerant system including the control device according to claim 1, the fault tolerant system comprising: the plurality of sub-systems.

9. A control method of controlling a fault tolerant system including a plurality of sub-systems, the method comprising:

receiving data from a processor unit included in the plurality of sub-systems, each of the sub-systems including: a processor unit operable in a lockstep synchronous state of the plurality of sub-systems and in a lockstep asynchronous state of the plurality of sub-systems, an input-output unit, connected with the processor unit, a control unit connected between the processor unit and the input-output unit, and a signal transmission path connecting the plurality of sub-systems to one another through the control unit, the signal transmission path including a plurality of signal transmission paths;

transmitting, when the processor unit is in the lockstep synchronous state, error detection data generated from first access data of accessing from the processor unit to the input-output unit in one of the sub-systems including the control unit, to a companion sub-system of the plurality of sub-systems, the companion sub-system being different from the one sub-system;

transmitting, when the processor unit is in the lockstep asynchronous state, the first access data of accessing from the processor unit to the input-output unit in the one sub-system, to the companion sub-system, the one sub-system and the companion sub-system being in the plurality of sub-systems; and controlling so that, (i) when the processor unit is in the lockstep synchronous state, the error detection data that is generated from the first access data of accessing from the processor unit to the input-output unit in the one sub-system is transmitted to the companion sub-system, and the second access data of accessing from the input-output unit to the processor unit in the one sub-system is transmitted to the companion sub-system, by sharing one signal transmission path, and (ii) when the processor unit is in the lockstep asynchronous state, the one signal transmission path is used for either (a) transmission of the first access data of accessing from the processor unit to the input-output unit in the one sub-system, to the companion sub-system, or (b) transmission of the second access data of accessing from the input-output unit to the processor unit in the one sub-system, to the companion sub-system.

10. A non-transitory computer-readable storage medium storing a program causing a computer of a control device included in a plurality of sub-systems included in a fault tolerant system to execute processing of:

receiving data from a processor unit in the plurality of sub-systems, each of the sub-systems including:

a processor unit, operable in a lockstep synchronous state of the plurality of sub-systems and in a lockstep asynchronous state of the plurality of sub-systems, an input-output unit connected with the processor unit, and a signal transmission path connecting the plurality of sub-systems to one another through the control device, the signal transmission path including a plurality of signal transmission paths, the control device being connected between the processor unit and the input-output unit;

transmitting, when the processor unit is in the lockstep synchronous state, error detection data that is generated from first access data of accessing from the processor unit to the input-output unit in one of the sub-systems including the control device, to a companion sub-system of the plurality of sub-systems, the one sub-system and the companion sub-system being in the plurality of sub-systems, the companion sub-system being different from the one sub-system;

transmitting, when the processor unit is in the lockstep asynchronous state, the first access data of accessing from the processor unit to the input-output unit in the one sub-system, to the companion sub-system; and controlling so that,
   (i) when the processor unit is in the lockstep synchronous state, the error detection data that is generated from the first access data of accessing from the processor unit to the input-output unit in the one sub-system is transmitted to the companion sub-system, and the second access data of accessing from the input-output unit to the processor unit in the one sub-system is transmitted to the companion sub-system, by sharing one signal transmission path, and
   (ii) when the processor unit is in the lockstep asynchronous state, the one signal transmission path is used for either (a) transmission of the first access data of accessing from the processor unit to the input-output unit in the one sub-system, to the companion sub-system, or (b) transmission of the second access data of accessing from the input-output unit to the processor unit in the one sub-system, to the companion sub-system.

* * * * *